US012547104B2

(12) United States Patent
Imaeda et al.

(10) Patent No.: US 12,547,104 B2
(45) Date of Patent: Feb. 10, 2026

(54) IMAGE FORMING APPARATUS HAVING A FIXING DEVICE ATTACHABLE AND DETACHABLE FROM A HOUSING AND A SHUTTER MOVABLE BETWEEN AN OPEN AND CLOSE POSITION

(71) Applicant: BROTHER KOGYO KABUSHIKI KAISHA, Nagoya (JP)

(72) Inventors: Hirotaka Imaeda, Nagoya (JP); Tokifumi Tanaka, Komaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/435,301

(22) Filed: Feb. 7, 2024

(65) Prior Publication Data

US 2024/0264555 A1 Aug. 8, 2024

(30) Foreign Application Priority Data

Feb. 7, 2023 (JP) ................................ 2023-016747
Feb. 7, 2023 (JP) ................................ 2023-016748
Feb. 7, 2023 (JP) ................................ 2023-016749

(51) Int. Cl.
*G03G 15/20* (2006.01)

(52) U.S. Cl.
CPC ..... *G03G 15/2017* (2013.01); *G03G 15/2064* (2013.01)

(58) Field of Classification Search
None
See application file for complete search history.

(56) References Cited

U.S. PATENT DOCUMENTS 9,081,358 B2 * 7/2015 Maeda ............... G03G 15/2017
11,474,449 B2 * 10/2022 Oguni ................ G03G 15/5029
2002/0186986 A1 12/2002 Makihira
2004/0052548 A1 3/2004 Shimizu et al.
2005/0135838 A1 * 6/2005 Miller ................ G03G 15/0855 399/262
2018/0333974 A1 11/2018 Yamano et al.
(Continued)

FOREIGN PATENT DOCUMENTS

JP H09297489 A 11/1997
JP 2002323822 A 11/2002
(Continued)

*Primary Examiner* — Arlene Heredia Ocasio
(74) *Attorney, Agent, or Firm* — Scully, Scott, Murphy & Presser, P.C.

(57) ABSTRACT

An image forming apparatus includes a fixing device and a main housing. The main housing includes a contact portion that contacts the fixing device. The fixing device includes a fixing device housing having an opening, a shutter configured to move between an open position in which the shutter opens the opening and a close position in which the shutter closes the opening, a spring, and a moving member interlocking with the shutter that moves between a first position and a second positon. In a process of attaching the fixing device to the main housing, the moving member moves from the first positon to the second positon, thereby causing the shutter to move to the open position against the biasing force of the spring. In a process of detaching the fixing device from the main housing, the biasing force of the spring causes the shutter to move to the close position.

6 Claims, 16 Drawing Sheets

(56) References Cited

U.S. PATENT DOCUMENTS

| | | | |
|---|---|---|---|
| 2019/0163121 | A1 | 5/2019 | Wada et al. |
| 2020/0117128 | A1 | 4/2020 | Matsuno et al. |

FOREIGN PATENT DOCUMENTS

| | | | |
|---|---|---|---|
| JP | 2004157511 | A | 6/2004 |
| JP | 2007034009 | A | 2/2007 |
| JP | 2007093648 | A | 4/2007 |
| JP | 2007171850 | A | 7/2007 |
| JP | 2008096603 | A | 4/2008 |
| JP | 2013224987 | A | 10/2013 |
| JP | 2016075752 | A | 5/2016 |
| JP | 2018194824 | A | 12/2018 |
| JP | 2019101165 | A | 6/2019 |
| JP | 2020060743 | A | 4/2020 |

* cited by examiner

IMAGE FORMING APPARATUS HAVING A FIXING DEVICE ATTACHABLE AND DETACHABLE FROM A HOUSING AND A SHUTTER MOVABLE BETWEEN AN OPEN AND CLOSE POSITION

REFERENCE TO RELATED APPLICATIONS

This application claims priority from Japanese Patent Application Nos. 2023-016747, 2023-016748, and 2023-016749 filed on Feb. 7, 2023. The entire contents of the priority applications are incorporated herein by reference.

BACKGROUND ART

An image forming apparatus including a main housing, a main cover for covering an opening of the main housing, and a shutter for openably closing a heating roller is known in the art. The shutter is caused to rotate between a close position in which the shutter covers the heating roller and an open position in which the shutter does not cover the heating roller. The shutter is caused to open and close in synchronization with opening and closing of a main cover covering an opening of the main housing.

A fixing device including a shutter for openably closing a heating roller is known in the art. The shutter is caused to rotate between a close position in which the shutter covers the heating roller and an open position in which the shutter does not cover the heating roller. The shutter, when caused to rotate from the close position to the open position, is caused to move away from the heating roller when caused to rotate from the close position to the open position.

Another image forming apparatus including a main housing, a fixing device located in the main housing, and a pin provided in the fixing device is known in the art. The fixing device positioned in the main housing by engaging the pin in a groove provided in the main housing.

SUMMARY

In the image forming apparatus with the shutter caused to open and close in synchronization with the opening and closing of the main cover, the shutter is caused to rotate even when the fixing device is not to be replaced. Therefore, the number of times the shutter is caused to open and close would be more than necessary, to thereby hasten wearing out of an actuator mechanism for the shutter.

It would be desirable to restrain the wearing of the actuator mechanism of the shutter of a fixing device.

When such a shutter is provided in the fixing device, the shutter would protrude greatly from a fixing device housing of the fixing device when the shutter is located in the open position. In this instance, a space for opening the shutter is necessary in the main housing of the image forming apparatus, and there is a possibility that the image forming apparatus would disadvantageously increase in size.

It would be desirable to reduce the amount of protrusion of the shutter protruding outward from the fixing device housing of the fixing device to restrain the increase in size of the image forming apparatus.

The image forming apparatus with a pin used to position the fixing device, typically, the pin is simply dropped and put into the groove. Therefore, there is a possibility that the fixing device is not precisely positioned because the pin is not pressed against a reference surface of the groove with necessary force.

It would be desirable to provide an image forming apparatus that can precisely position the fixing device.

In one aspect, an image forming apparatus disclosed herein comprises a fixing device and a main housing.

The main housing supports the fixing device in a manner that allows the fixing device to be attached thereto and detached therefrom. The main housing includes a contact portion. The contact portion contacts the fixing device.

The fixing device thermally fixes a toner image onto a sheet. The fixing device comprises a fixing device housing, a shutter, a spring, and a moving member.

The fixing device housing has an opening that allows a sheet to pass therethrough.

The shutter is configured to move between an open position in which the shutter opens the opening and a close position in which the shutter closes the opening.

The spring biases the shutter in such a direction as to cause the shutter to close the opening.

The moving member is interlocked with the shutter. The moving member is movable between a first position and a second position. When the moving member is located in the first position, the shutter is caused to be in the closed positon. When the moving member is located in the second positon, the shutter is caused to be in the open position.

In a process of attaching the fixing device to the main housing, contact of the moving member with the contact portion causes the moving member to move from the first position to the second position, thereby causing the shutter to move from the close position to the open position against a biasing force of the spring.

In a process of detaching the fixing device from the main housing, the shutter is caused to move to the close position by the biasing force of the spring.

Since the fixing device comprises the moving member and the spring, the shutter opens and closes only on the two occasions: when the fixing device is attached to the main housing and when the fixing device is detached from the main housing. Thus, the wearing out of the actuator mechanism for the shutter can be restrained.

The image forming apparatus may further comprise a process unit configured to form the toner image on a sheet. The process unit is attachable to and detachable from the main housing. The contact portion contacts the process unit in a state that the process unit has been attached to the main housing.

Since the contact portion contacts the process unit, the contact portion can also be used to positon the process unit.

A direction of a force applied from the moving member to the contact portion is opposite to a direction of a force applied from the process unit to the contact portion.

Since the direction of the force applied from the moving member to the contact portion is opposite to the direction of the force applied from the process unit to the contact portion, the force applied from the moving member to the contact portion and the force from the process unit counterbalance each other. Thus, distortion of the contact portion can be restrained.

The contact portion may be a shaft. The shaft extends in a direction of a width of a sheet, the width of a sheet being a direction perpendicular to a direction in which a sheet is conveyed.

Since the contact portion is a shaft, the location at which the fixing device contacts the contact portion can be a location inward in the direction of the width of a sheet, the fixing device can be restrained from increasing in size in the direction of the width of a sheet.

The main housing may include a first side frame and a second side frame. The second side frame may be located apart from the first side frame in the direction of the width of a sheet.

The shaft may connect the first side frame and the second side frame.

Since the shaft connects the first side frame and the second side frame, distortion of the shaft as would be caused by a force received from the process unit and the like can be restrained, and the process unit can be positioned with higher precision.

The moving member may support the shutter in a manner that allows the shutter to rotate. In this instance, the moving member is retracted into the fixing device housing when located in the second position relative to when located in the first positon.

The fixing device may further comprise an opposing portion.

The opposing portion faces the shutter in a direction parallel to directions of movement of the moving member. The opposing portion is located in a positon apart from a rotation axis of the shutter in a direction perpendicular to the directions of movement of the moving member.

In a process of movement of the moving member from the first position to the second position, the shutter comes in contact with the opposing portion, thereby causing the shutter to rotate and move to the open positon.

Since the moving member supports the shutter in a manner that allows the shutter to rotate, when the moving member moves from the first positon to the second positon, the rotation axis of the shutter can be moved to the inside of the fixing device housing. Thus, the amount of protrusion of the shutter which protrudes outside of the main housing when the shutter is in an open state can be reduced.

The spring may comprise a shutter spring and a move spring.

The shutter spring may biases the shutter in such a direction as to cause the shutter to close the opening.

The move spring biases the moving member away from the second positon toward the first positon.

Since the fixing device comprises a shutter spring, the shutter spring can cause the shutter to be closed. Since the fixing device comprises a move spring, the move spring can cause the moving member to return to the first positon.

The moving member may protrude from an outer surface of the fixing body when the moving member is located in the first position.

Since the moving member located in the first positon protrudes from the outer surface of the fixing device housing, the moving member can be pushed from outside of the fixing device housing with increased ease.

The fixing device may further include a support member. The support member supports the moving member in a manner that allows the moving member to rotate. The support member includes an opposing portion.

The shutter may include a first shutter and a second shutter. The first shutter is rotatably supported by the moving member. The second shutter is rotatably supported by the first shutter.

Since the second shutter is rotatable relative to the first shutter, for example, the second shutter can be angled relative to the first shutter when the shutter is in the open state. Thus, the amount of protrusion of the shutter protruding from the fixing device housing can be reduced.

The first shutter may have a through hole. The through hole extends through the first shutter in a direction of thickness of the first shutter.

Since the first shutter includes the through hole, the heat generated inside the fixing device housing can be dissipated from the through hole of the shutter.

The opening may be an opening through which a sheet conveyed into the fixing device housing passes.

The shutter may include a through hole. The through hole may extend through the shutter in an up-down direction when the shutter is in an open state.

Since the through hole extends through the shutter in the up-down direction in a state that the shutter is open, the heat generated inside the fixing device housing can be dissipated upward through the through hole of the shutter.

The fixing device may further comprise a heating member and a pressure member. The heating member may be configured to heat a sheet. The pressure member may be configured to nip a sheet in combination with the heating member.

In another aspect, a fixing device comprising a fixing device housing, a shutter, a moving member, and an opposing portion is disclosed herein.

The fixing device housing has an opening that allows a sheet to pass therethrough.

The shutter is configured to move between an open position in which the shutter opens the opening and a close position in which the shutter closes the opening. The shutter is rotatable.

The moving member is movable between a first positon and a second position. The second position is a position of the moving member retracted into the housing relative to the first positon. The moving member supports the shutter in a manner that allows the shutter to rotate.

The opposing portion is configured to face the shutter in a direction parallel to directions of movement of the moving member. The opposing portion is located apart from a rotation axis of the shutter in a direction perpendicular to the directions of movement of the moving member.

In the process of movement of the moving member from the first position to the second positon, the shutter comes in contact with the opposing portion, causing the shutter to rotate and thereby cause the shutter to move to the open position in which the shutter opens the opening.

Since the moving member supports the shutter in a manner that allows the shutter to rotate, when the moving member moves from the first positon to the second position, the rotation axis of the shutter can be moved to the inside of the fixing device housing. Thus, the amount of protrusion of the shutter which protrudes outside of the main housing when the shutter is in an open state can be reduced.

The fixing device may further comprise a shutter spring. The shutter spring may bias the shutter in such a direction as to cause the shutter to close the opening.

Since the fixing device comprises the shutter spring, the shutter can be closed by the action of the shutter spring.

The fixing device may further comprise a move spring. The move spring may bias the moving member away from the second position toward the first position.

Since the fixing device comprises the move spring, the moving member can be returned to the first position by the move spring.

The moving member may be configured to protrude from an outer surface of the fixing device housing when located in the first position.

Since the moving member located in the first position protrudes from the outer surface of the fixing device housing, the moving member can be pushed from the outside of the fixing device housing with increased ease.

The fixing device may further include a support member. The support member supports the moving member in a manner that allows the moving member to move. The support member includes an opposing portion.

The shutter may include a first shutter and a second shutter. The first shutter is rotatably supported by the moving member. The second shutter is rotatably supported by the first shutter.

Since the second shutter is rotatable relative to the first shutter, for example, the second shutter can be angled relative to the first shutter when the shutter is in the open state. Thus, the amount of protrusion of the shutter protruding from the fixing device housing can be reduced.

The first shutter may have a through hole. The through hole extends through the first shutter in a direction of thickness of the first shutter.

Since the first shutter is configured to have the through hole, the heat generated inside the fixing device housing can be dissipated through the through hole of the shutter.

The opening may be an opening through which a sheet conveyed into the fixing device housing passes.

The shutter may include a through hole. The through hole may extend through the shutter in an up-down direction when the shutter is in an open state.

Since the through hole extends through the shutter in the up-down direction in a state that the shutter is open, the heat generated inside the fixing device housing can be dissipated upward through the through hole of the shutter.

The moving member may further include a boss. In this instance the shutter may include a hole in which the boss is inserted. The shutter is rotatably supported by the boss.

The fixing device may further comprise a heating member and a pressure member. The heating member may be configured to heat a sheet. The pressure member may be configured to nip a sheet in combination with the heating member.

In another aspect, an image forming apparatus disclosed herein comprises a fixing device and a main housing.

The fixing device thermally fixes a toner image to a sheet.

The main housing supports the fixing device in a manner that allows the fixing device to be attached thereto and detached therefrom.

The fixing device comprises a fixing device housing, a moving member, and a spring.

The fixing device housing is attachable to and detachable from the main housing. The fixing device housing includes a reference shaft and a rotation stopping portion.

The reference shaft positons the fixing device housing in relation to the main housing.

The rotation stopping portion contacts the main housing and thereby stops the rotation of the fixing device housing around the reference shaft.

The moving member is movable between a first positon and a second position. The second position is a position retracted into the fixing device housing relative to the first positon.

The spring biases the moving member from the second positon to the first positon.

The main housing includes a contact portion, a reference surface, a second reference surface, and a restraining surface.

The contact portion contacts the moving member and receives the biasing force of the spring.

The reference surface contacts the reference shaft in a state that the fixing device is attached to the main housing. The reference surface is perpendicular to directions of movement of the moving member.

The second reference surface is non-parallel to the reference surface. The second reference surface contacts with the reference shaft in a state that the fixing device is attached to the main housing.

The restraining surface contacts the rotation stopping portion in the state that the fixing device is attached to the main housing. The restraining surface restrains a rotation of the rotation stopping portion around the reference shaft.

When the fixing device is attached to the main housing, the spring biases the reference shaft toward the references surface and bias the rotation stopping portion toward the restraining surface.

Since the image forming apparatus includes the reference shaft, the reference surface, the second reference surface, and the restraining surface, in the state that the fixing device is attached to the main housing, the reference shaft contacts with the reference surface and the second reference surface, whereby positioning the reference shaft relative to the man housing in two directions. Since the spring biases the reference shaft toward the reference surface, the contact of the reference shaft with the reference surface is ensured. Since the spring biases the rotation stopping portion toward the restraining surface, the contact of the rotation stopping portion and the restraining portion is ensured, thereby the posture of the fixing device is adjusted properly. With the features as described above, the fixing device can be positioned in the main housing with higher precision.

The image forming apparatus may further comprise a process unit configured to form the toner image on a sheet.

The process unit is attachable to and detachable from the main housing.

In the state that the process unit is attached to the main housing, the contact portion may contact the process unit.

Since the contact surface contacts the process unit, the contact surface can be used to positon the process unit.

A direction of a force applied from the moving member to the contact portion may be opposite to a direction of a force applied from the process unit to the contact portion.

Since the direction of the force applied from the moving member to the contact portion is opposite to the direction of the force applied from the process unit to the contact portion, a biasing force of the move spring and the force from the process unit counterbalance each other. Thus, the contact portion can be restrained from deforming.

The main housing may include a guide surface and a protrusion.

The guide surface guides the reference shaft.

The protrusion protrudes from the guide surface. The protrusion may include the reference surface provided at a downstream side thereof in a direction of attachment of the fixing device. The protrusion may include an inclined surface being provided at an upstream side thereof in the direction of attachment of the fixing device. The inclined surface is inclined relative to the guide surface.

Since the protrusion includes a inclined surface, the reference shaft can smoothly pass the protrusion, and the reference shaft can be smoothly guided to the reference surface.

The image forming apparatus may further comprise an attaching spring.

The attaching spring is a spring for attaching the fixing device to the main housing. The attaching spring bias the fixing device toward the main housing. The attaching spring contacts the reference shaft. The attaching spring biases the reference shaft toward the reference surface.

Since the attaching spring biases the reference shaft toward the reference surface, the fixing device can be positioned in the main housing with higher precision by the biasing force of the attaching spring.

The reference shaft may have a cylindrical shape.

The reference shaft may include a curved surface and a flat surface. In this instance, the curved surface contacts the reference surface. The flat surface contacts the attaching spring.

The attaching spring may bias the reference shaft toward the reference surface and the second reference surface.

Since the attaching spring biases the reference shaft toward the reference surface and the second reference surface, the contact of the reference shaft with the reference surface and the second reference surface is ensured, whereby the fixing device can be positioned relative to the main housing in two directions with higher precision.

The fixing device housing may include an opening through which a sheet conveyed into the fixing device passes. The fixing device may further comprise a shutter and an opposing portion.

The shutter may be configured to move between an open position in which the shutter opens the opening and a close position in which the shutter closes the opening. The shutter may be caused to rotate. The shutter may be rotatably supported by the moving member.

The opposing portion faces the shutter in a direction parallel to directions of movement of the moving member. The opposing portion is located in a positon located apart from a rotation axis of the shutter in a direction perpendicular to the directions of movement of the moving member.

In the process of movement of the moving member from the first position to the second position, the shutter contacts the opposing portion, whereby the shutter is caused to rotate and move to the open position in which the shutter opens the opening.

Since the moving member supports the shutter in a manner that allows the shutter to rotate, the rotation axis of the shutter can be moved to the inside of the fixing device housing when the moving member moves from the first position to the second position. Thus, the amount of the shutter protruding outside of the main housing when the shutter is in an open state can be reduced.

The spring may comprise a shutter spring and a move spring.

The shutter spring biases the shutter in such a direction as to cause the shutter to be closed.

The move spring bias the moving member from the second positon to the first positon.

Since the fixing device comprises a shutter spring, the shutter spring can be caused to close the shutter. Since the fixing device comprises a move spring, the move spring can be caused to return the moving member to the first positon.

The moving member may protrude from an outer surface of the fixing device housing when the moving member is located in the first position.

Since the moving member located in the first positon protrudes from the outer surface of the fixing device housing, the moving member can be pushed from outside of the fixing device housing with increased ease.

The fixing device may further include a support member. The support member supports the moving member in a manner that allows the moving member to rotate. The support member includes an opposing portion.

The shutter may include a first shutter and a second shutter. The first shutter is rotatably supported by the moving member. The second shutter is rotatably supported by the first shutter.

Since the second shutter is rotatable relative to the first shutter, for example, the second shutter can be angled relative to the first shutter when the shutter is in the open state. Thus, the amount of protrusion of the shutter protruding from the fixing device housing can be reduced.

The first shutter may have a through hole. The through hole extends through the first shutter in a direction of thickness of the first shutter.

Since the first shutter includes the through hole, the heat generated inside the fixing device housing can be dissipated through the through hole of the shutter.

The opening may be an opening through which a sheet conveyed from outside into the fixing device housing passes.

The shutter may include a through hole. The through hole extends through the shutter in an up-down direction when the shutter is in an open state.

Since the through hole extends through the shutter in the up-down direction in a state that the shutter is open, the heat generated inside the fixing device housing can be dissipated upward through the through hole of the shutter.

The fixing device may further comprise a heating member and a pressure member. The heating member may be configured to heat a sheet. The pressure member may be configured to nip a sheet in combination with the heating member.

In yet another aspect, an image forming apparatus disclosed herein comprises a fixing device, a main housing, and an attaching spring.

The fixing device thermally fixes a toner image onto a sheet.

The main housing supports the fixing device in a manner that allows the fixing device to be attached thereto and detached therefrom The attaching spring is a spring for attaching the fixing device to the main housing. The attaching spring bias the fixing device toward the main housing.

The fixing device comprises a fixing device housing.

The fixing device housing is attachable to and detachable from the main housing. The fixing device housing includes a reference shaft. The reference shaft position the fixing device housing in relation to the main housing.

The main housing includes a guide surface. In a state that the fixing device housing is attached to the main housing, the guide surface contacts the reference shaft.

The attaching spring contacts the reference shaft. The attaching spring bias the reference shaft toward the reference surface.

Since the attaching spring bias the reference shaft toward the reference surface, the fixing device can be positioned in the main housing with higher precision by the biasing force of the attaching spring.

The main housing may further include a second reference surface. The second reference surface is non-parallel to the reference surface. The second reference surface contacts the reference shaft when the fixing device is attached to the main housing.

The attaching spring biases the reference shaft toward the reference surface and the second reference surface.

Since the attaching spring bias the reference shaft toward the reference surface and the second reference surface, the fixing device can be positioned relative to the main housing in two directions with higher precision by the biasing force of the attaching spring.

BRIEF DESCRIPTION OF DRAWINGS

The above aspects, other advantages and further features will become more apparent by describing in detail illustrative, non-limiting embodiments thereof with reference to the accompanying drawings, in which.

DESCRIPTION

Figure 1:
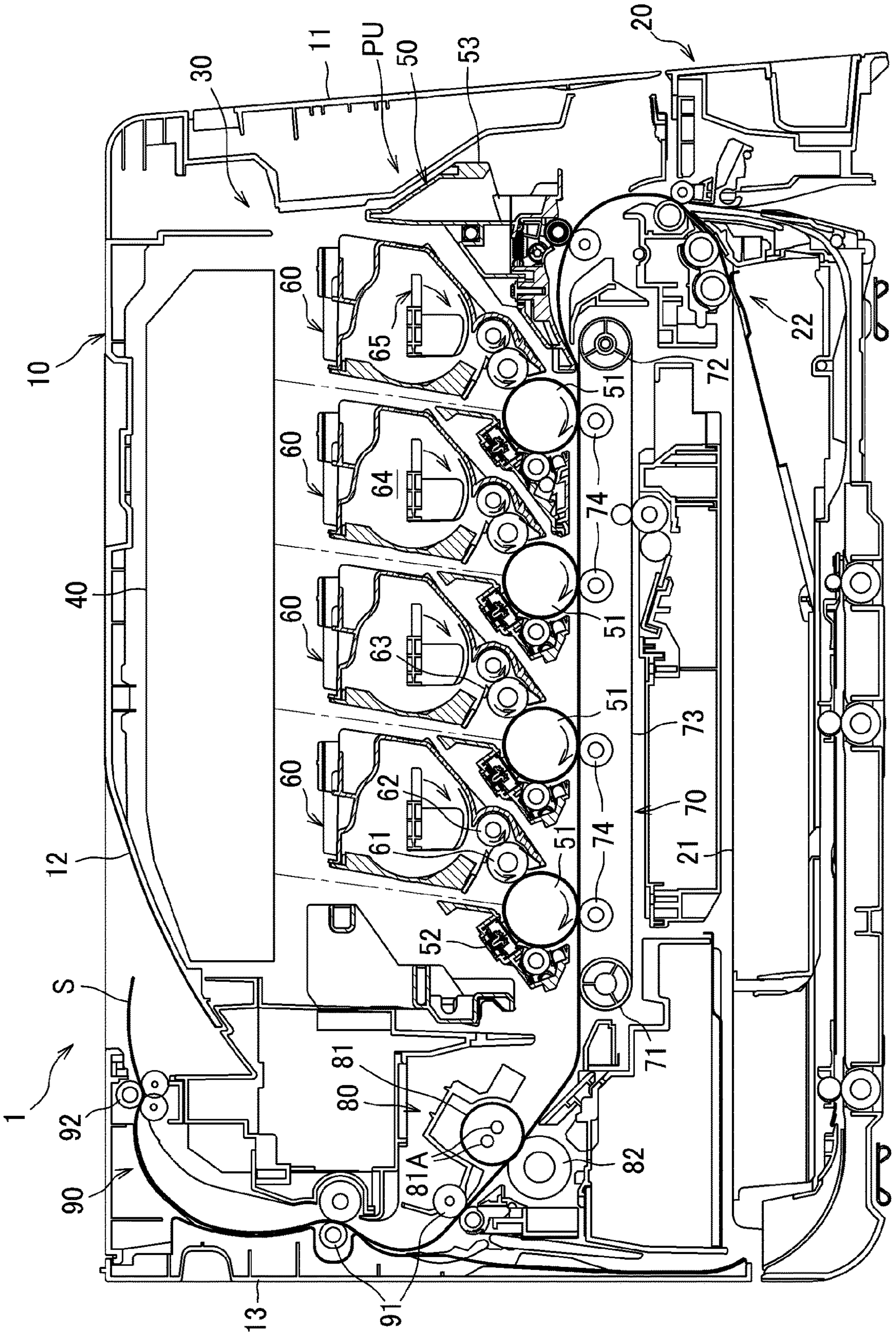
FIG. 1 is a cross-sectional view of an image forming apparatus.

Next, an illustrative, non-limiting embodiment will be described in detail with reference made to the drawing where appropriate.

As shown in FIG. 1, an image forming apparatus 1 comprises a main housing 10, a sheet feeder unit 20, an image forming unit 30, and a sheet ejection unit 90.

The main housing 10 comprises a front cover 11, an output tray 12, and a rear cover 13. The front cover 11 openably closes an opening provided at a front side of the main housing 10. The rear cover 13 openably closes an opening provided at a rear side of the main housing 10.

The sheet feeder unit 20 includes a sheet tray 21 and a feeder mechanism 22. The sheet tray 21 contains sheets S of paper or the like. The feeder mechanism 22 feeds the sheets S in the sheet tray 21 to the image forming unit 30.

The image forming unit 30 comprises an exposure device 40, a process unit PU, a transfer unit 70, and a fixing device 80.

The exposure device 40 is located above the process unit PU. The exposure device 40 emits light beams to expose surfaces of photosensitive drums 51 to light.

The process unit PU is located between the sheet tray 21 and the exposure device 40. The process unit PU is attachable to and detachable from the main housing 10 through the opening that is made available by opening the front cover 11. The process unit PU comprises a drum cartridge 50 and a plurality of toner cartridges 60.

The drum cartridge 50 comprises a plurality of photosensitive drums 51, a plurality of chargers 52 corresponding to the plurality of photosensitive drums 51, and a drum frame 53.

The drum frame 53 supports the photosensitive drums 51 and the chargers 52. The drum frame 53 is movably supported by the main housing 10. The toner cartridge 60 is attachable to and detachable from the drum frame 53.

The plurality of toner cartridges 60 each contains toner a color of which is different from one another. Each toner cartridge 60 comprises a development roller 61, a supply roller 62, a doctor blade 63, a toner container 64 in which toner is contained, and an agitator 65.

The agitator 65 agitates toner inside the toner container 64. The agitator 65 supplies toner to the supply roller 62. The supply roller 62 supplies toner to the development roller 61. The doctor blade 63 adjusts toner on the development roller 61 to a uniform thickness.

The transfer unit 70 is located between the sheet tray 21 and the process unit PU. The transfer unit 70 comprises a drive roller 71, a follower roller 72, a conveyor belt 73, and a plurality of transfer rollers 74. The conveyor belt 73 is an endless belt for conveying a sheet S. The drive roller 71 and the follower roller 72 cause the conveyor belt 73 to rotate. The transfer roller 74 is located inside of the conveyor belt 73. The transfer rollers 74 are provided to have the conveyor belt 73 nipped between each transfer roller 74 and a corresponding photosensitive drum 51.

The fixing device 80 comprises a heating roller 81 as an example of a heating member, and a pressure roller 82 as an example of a pressure member. The heating roller 81 heats a sheet S conveyed through between the heating roller 81 and the pressure roller 82. Two heaters 81A are disposed inside the heating roller 81. The heating roller 81 rotates when receiving a driving force from a driving source, not illustrated.

The pressure roller 82 nips a sheet S in combination with the heating roller 81. The pressure roller 82 is caused to rotate by the heating roller 81.

Each of the chargers 52 charges a surface of a corresponding photosensitive drum 51. The exposure device 40 exposes each photosensitive drum 51 to light. Thereby, an electrostatic latent image is formed on the photosensitive drum 51. Each development roller 61 supplies toner to the corresponding photosensitive drum 51. A toner image is thereby formed on the photosensitive drum 51.

The sheet feeder unit 20 feeds a sheet S onto the conveyor belt 73 which in turn convey the sheet S through between each photosensitive drum 51 and the corresponding transfer roller 74. The toner image on the photosensitive drum 51 is transferred onto the sheet S. The sheet S with the toner image transferred thereon is conveyed through between the heating roller 81 and the pressure roller 82. Thereby, the fixing device 80 thermally fixes the toner image onto the sheet S.

The sheet ejection unit 90 includes a conveyor roller 91 and an ejection roller 92. The conveyor roller 91 conveys a sheet S to the ejection roller 92. The ejection roller 92 ejects the sheet S onto the output tray 12.

Figure 2:
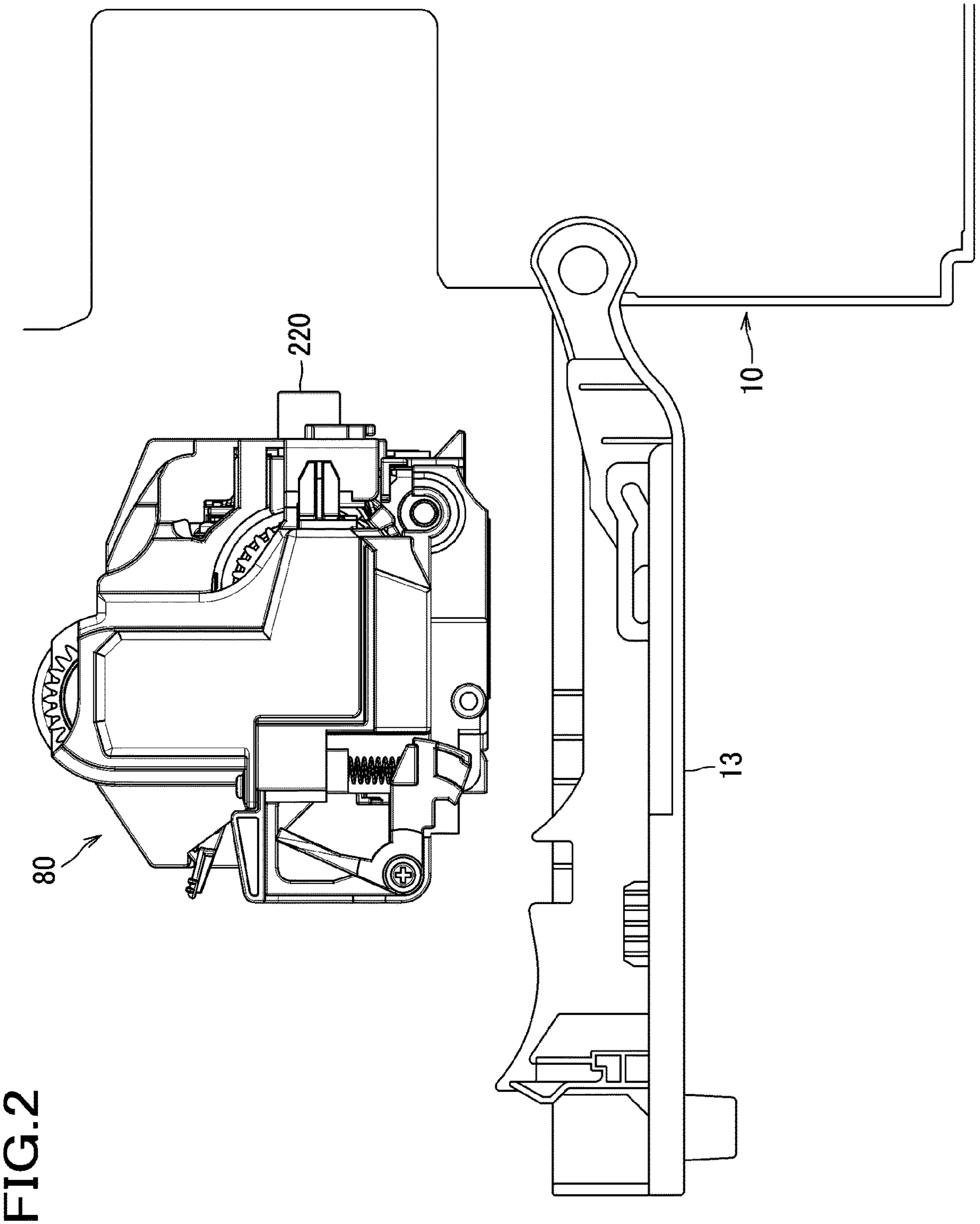
FIG. 2 is a diagram showing a state in which a fixing device is detached from a main housing.

As shown in FIG. 2, the fixing device 80 is attachable to and detachable from the main housing 10 through the opening that is made available by opening the rear cover 13. In other words, the main housing 10 supports the fixing device 80 in a manner that allows the fixing device 80 to be attached to and detached form the main housing 10.

Figure 3:
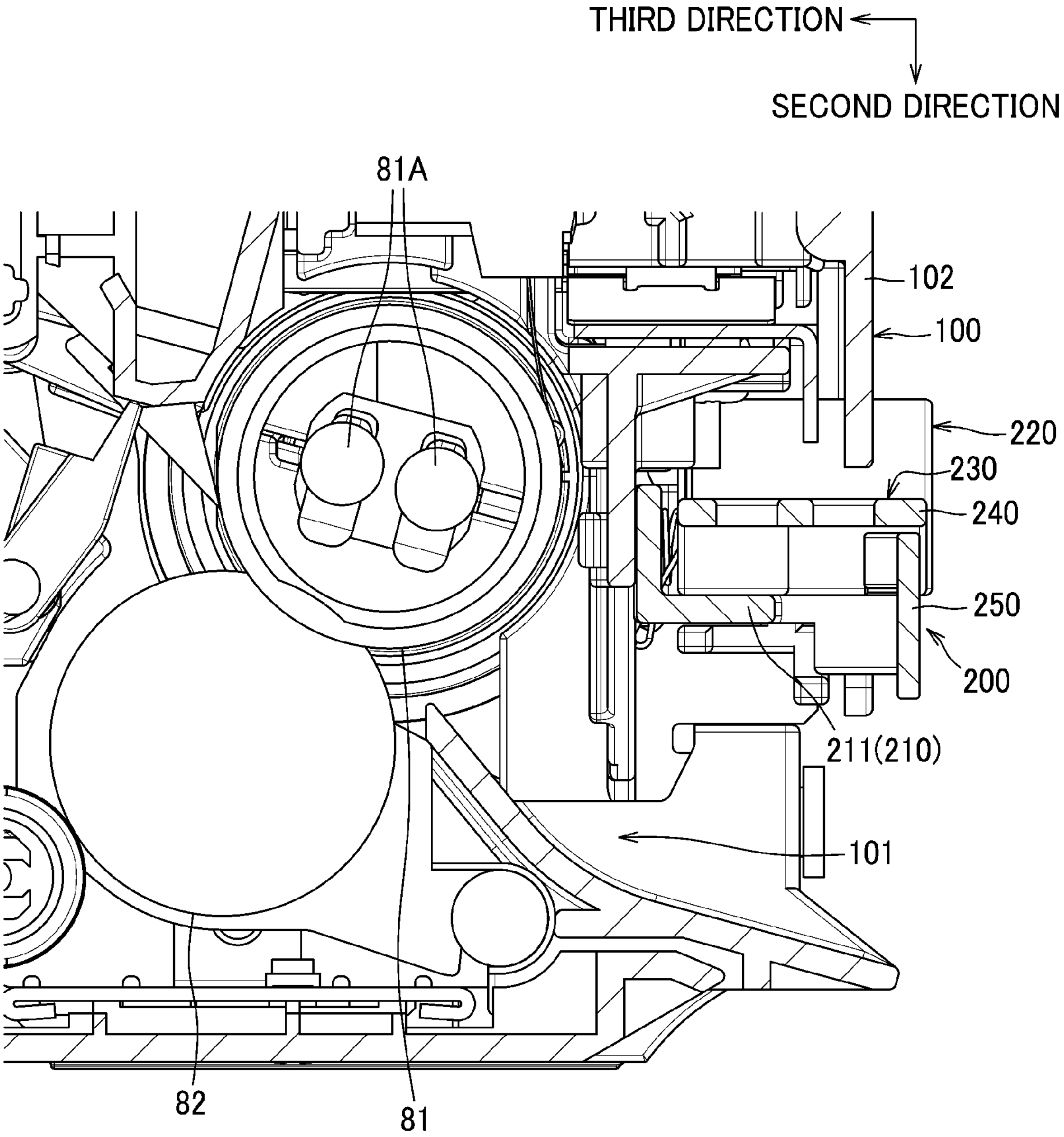
FIG. 3 is a cross-sectional view of a fixing device showing a state in which a shutter is open.

As shown in FIG. 3, the fixing device 80 further comprises a fixing device housing 100 and a shutter unit 200.

The fixing device housing 100 has an opening 101 that allows a sheet S to pass therethrough. The opening 101 is the opening through which a sheet S conveyed from the outside of the fixing device housing 100 passes to enter the fixing device housing 100. The fixing device housing 100 is attachable to and detachable from the main housing 10.

The shutter unit 200 is a mechanism for opening and closing the opening 101. The shutter unit 200 is switchable to an open state, i.e., an open position, shown in FIG. 3 and to a closed state, i.e., a close position, shown in FIG. 4. The shutter unit 200 opens the opening 101 when in the open state. The shutter unit 200 closes the opening 101 when in the closed state.

The shutter unit 200 may cover at least part of the opening 101 when in the closed state. Specifically, the shutter unit 200 covers the opening 101 to such an extent as not to allow a user to insert his/her finger therein.

Figure 5:
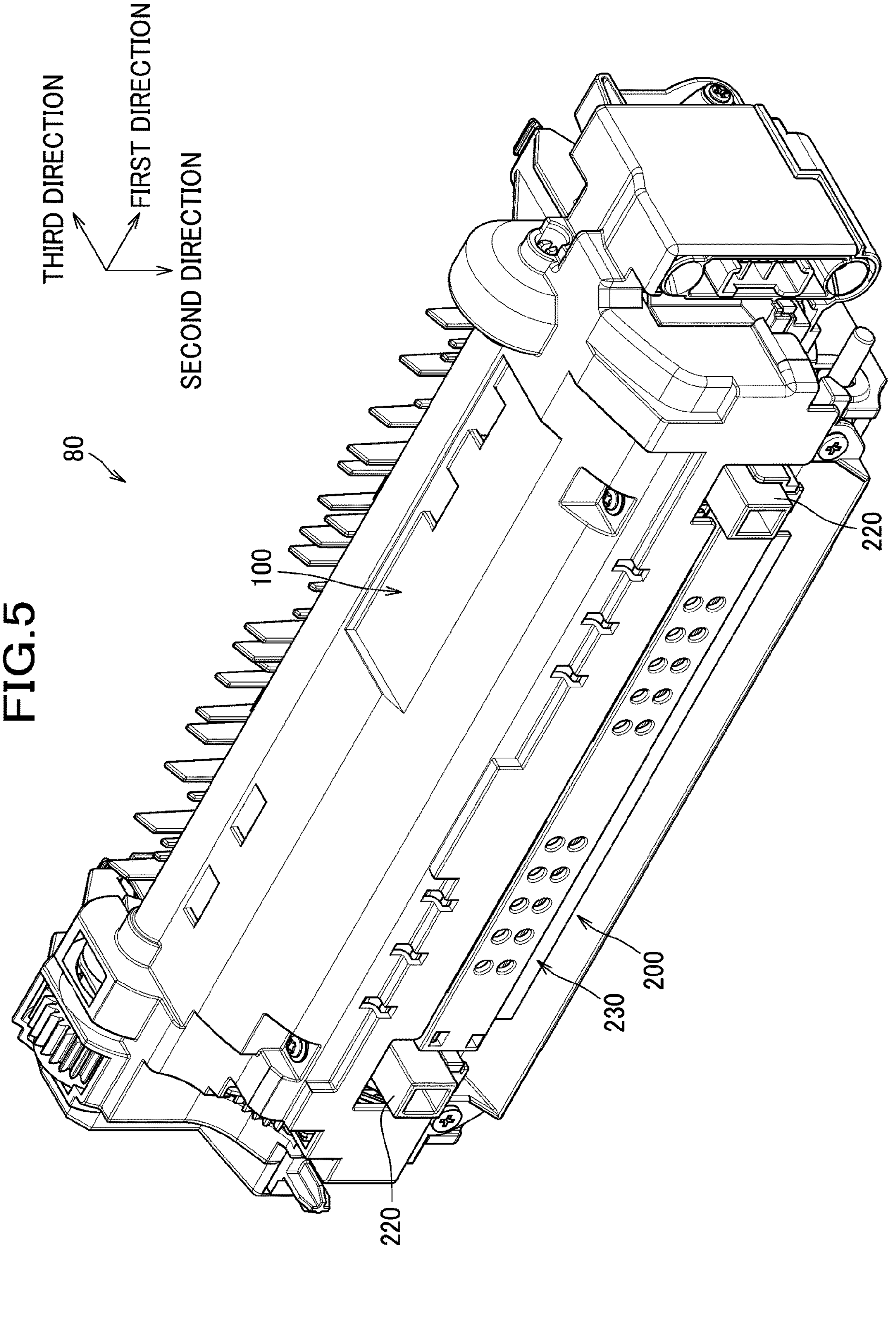
FIG. 5 is a perspective view of the fixing device.
Figure 6:
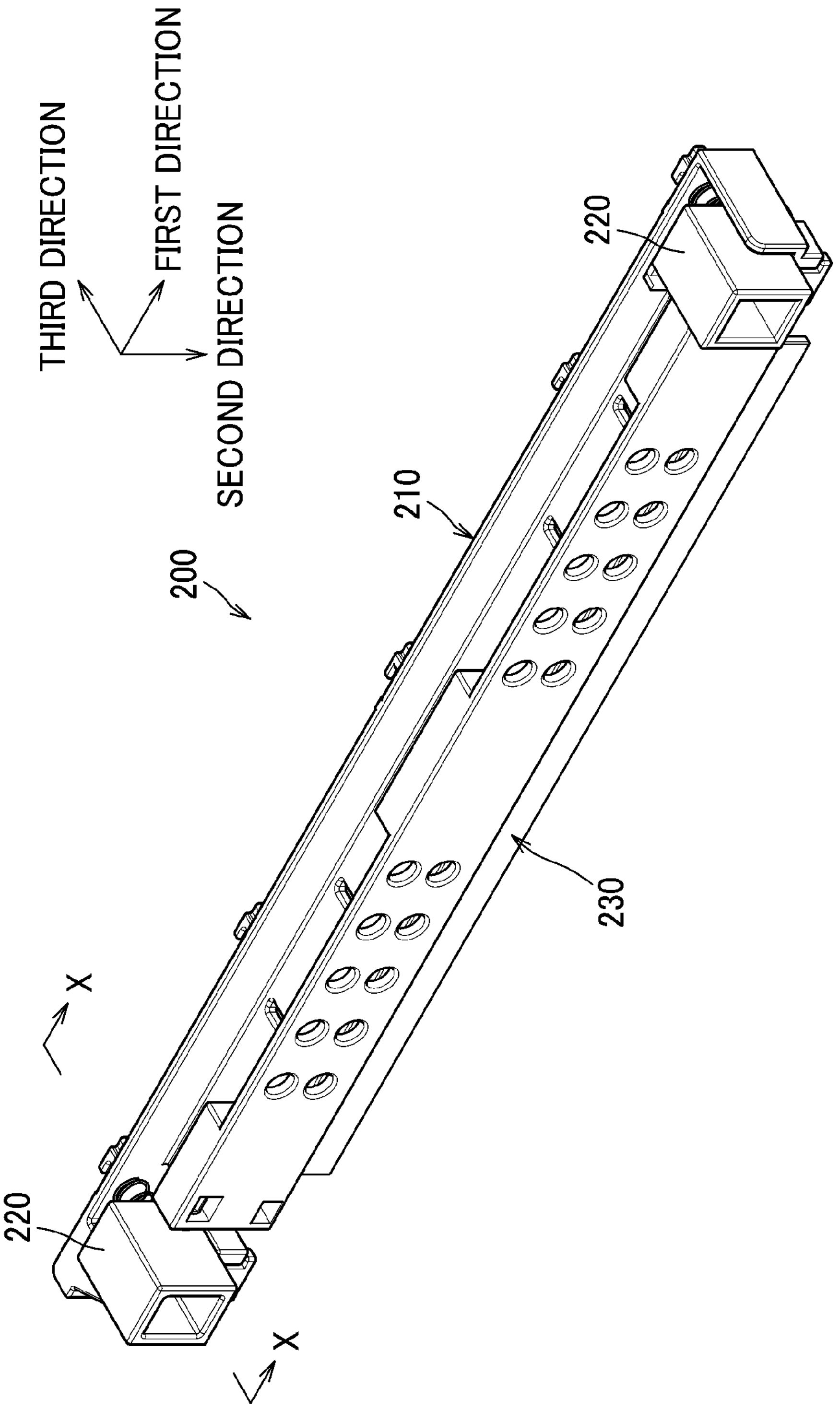
FIG. 6 is a perspective view of a shutter unit.

As shown in FIG. 5 and FIG. 6, the shutter unit 200 comprises a support member 210, two moving members 220, and a shutter 230. The support member 210, the two moving members 220, and the shutter 230 are made of plastic or the like. In the following descriptions, a first direction, a second direction, and a third direction shown in FIG. 5 will be used to describe the directions.

In the present embodiment, the first direction is a direction parallel to an axis of rotation of the heating roller 81. The first direction is also parallel to a direction of a width of a sheet, which is a direction perpendicular to a direction in which a sheet S is conveyed. The second direction is a direction perpendicular to the first direction. The second direction is also parallel to a vertical direction. The third direction is a direction perpendicular to the first direction and to the second direction.

The arrows showing the directions in the drawings point to a first side in the respective directions. In the present embodiment, a first side in the first direction is a rightward direction corresponding to a left-to-right direction as defined by the left side and the right side of the image forming apparatus 1. A first side in the second direction is a downward direction. A first side of the third direction is a rearward direction corresponding to a front-to-rear direction as defined by the front side and the rear side of the image forming apparatus 1. A direction opposite to the first side will be designated as a second side in the respective directions.

The support member 210 supports the moving member 230 in a manner that allows the moving member 230 to move in directions parallel to the third direction. As shown in FIG. 3, the support member 210 is fixed to the fixing device housing 100.

Figure 7:
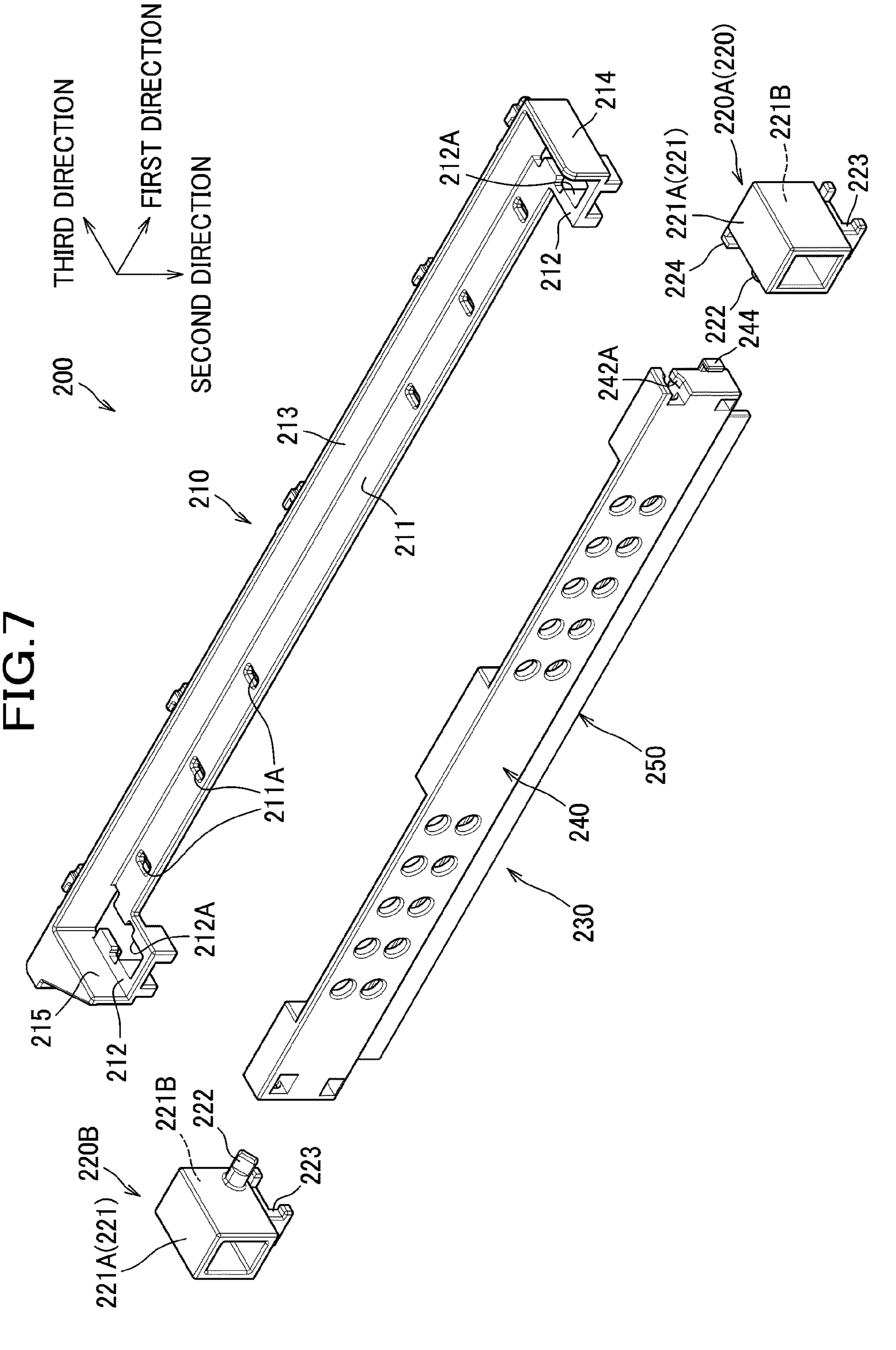
FIG. 7 is an exploded perspective view of the shutter unit.

As shown in FIG. 7, the support member 210 includes an opposing portion 211, two support portions 212, a first wall 213, a second wall 214, and a third wall 215.

The opposing portion 211 is a plate-shaped member. The opposing portion 211 has a surface perpendicular to the second direction. The opposing portion 211 includes a plurality of holes 211A. Each of the holes 211A extends through the opposing portion 211 in the second direction, i.e. in the up-down direction.

The support portions 212 are portions for supporting the moving members 220 in a manner that allows the moving members 220 to move. One of the two support portions 212 is located at one end (right end) of the opposing portion 211 facing toward the first side in the first direction. The other support portion 212 is located at the other end (left end) of the opposing portion 211 facing in the second side in the first direction.

The support portions 212 protrude farther, than the opposing portion 211, in a direction toward the second side in the third direction. Each of the support portions 212 includes a long hole 212A elongate in the third direction.

The first wall 213 protrudes from one sides, facing toward the first side the third direction, of the opposing portion 211 and the support portion 212 in a direction toward the second side in the second direction.

The second wall 214 is located at an end of the first wall 213 facing toward the first side in the first direction. The second wall 214 is located at one of the support portions 212 provided at the end of the opposing portion 211 facing in the direction toward the first side in the first direction, and extends in the direction toward the second side in the second direction. The support portion 212 provided at the one end of the opposing portion 211 is located between the opposing portion 211 and the second wall 214 arranged in the first direction.

The third wall 215 is located at an end of the first wall 213 facing toward the second side in the first direction. The third wall 215 is located at one of the support portions 212 provided at the other end of the opposing portion 211 facing in the direction toward the second side in the first direction, and extends in the direction toward the second side in the second direction. The support portion 212 provided at the other end of the opposing portion 211 is located between the opposing portion 211 and the third wall 215 arranged in the first direction.

Figure 4:
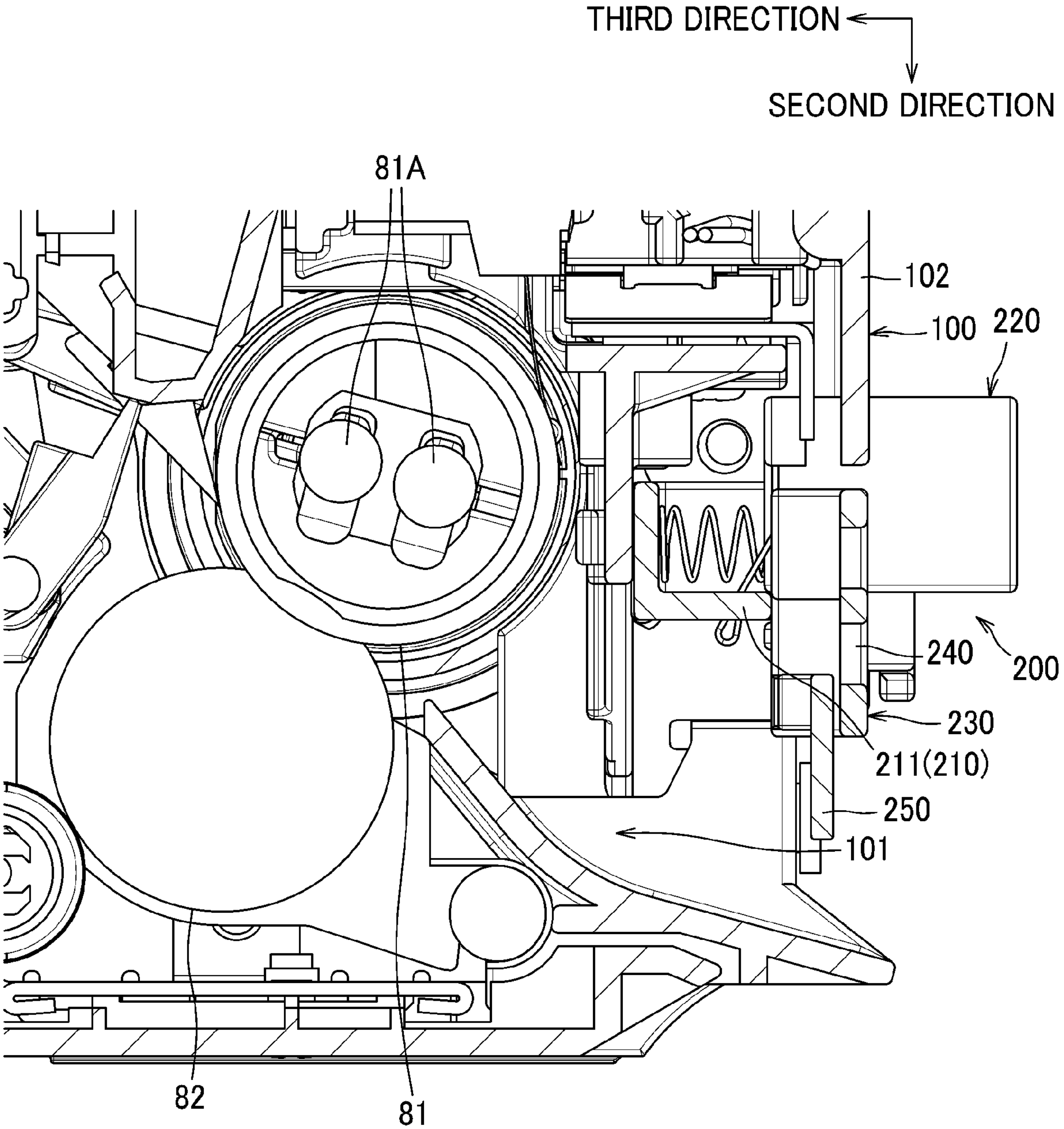
FIG. 4 is a cross-sectional view of the fixing device showing a state in which the shutter is closed.

The moving member 220 is capable of moving between a first position shown in FIG. 4 and a second position shown in FIG. 3. The second position is a position in which the moving member 220 is retracted into the fixing device housing 100 relative to the first position. When the moving member 220 is located in the first position, the moving member 220 protrudes from an outer surface 102 of the fixing device housing 100.

As shown in FIG. 7, one moving member 220 is disposed on each of two ends of the shutter 230 facing toward the first side in the first direction and toward the second side in the first direction. Each of the two moving members 220 includes a body 221, a boss 222, and a leg 223. In the following descriptions, the moving member 220 facing toward the first side in the first direction will be referred to as first moving member 220A, and the moving member 220 facing toward the second side in the first direction will be referred to as second moving member 220B.

The body 221 is supported by the corresponding support portion 212 of the support member 210 from below. The body 221 includes a first part 221A and a second part 221B. The first part 221A has a shape of a rectangular tube. The first part 221A has a dimension in the third direction greater than dimensions in the other directions. The second part 221B covers an opening provided at one side of the first part 221A facing toward the first side in the third direction.

The boss 222 protrudes from the body 221 in the first direction toward the shutter 203. The boss 222 supports the shutter 230 in a manner that allows the shutter 230 to rotate.

The leg 223 protrudes downward from the body 221. The leg 223 is inserted into the long hole 212A of the corresponding support portion 212.

The first moving member 220A further includes a spring hooking portion 224. The spring hooking portion 224 is a part for a shutter spring 260 (that will be described later) to be hooked thereon. The spring hooking portion 224 is disposed at a surface of the body 221 facing to the shutter 230.

Figures 8A, 8B:
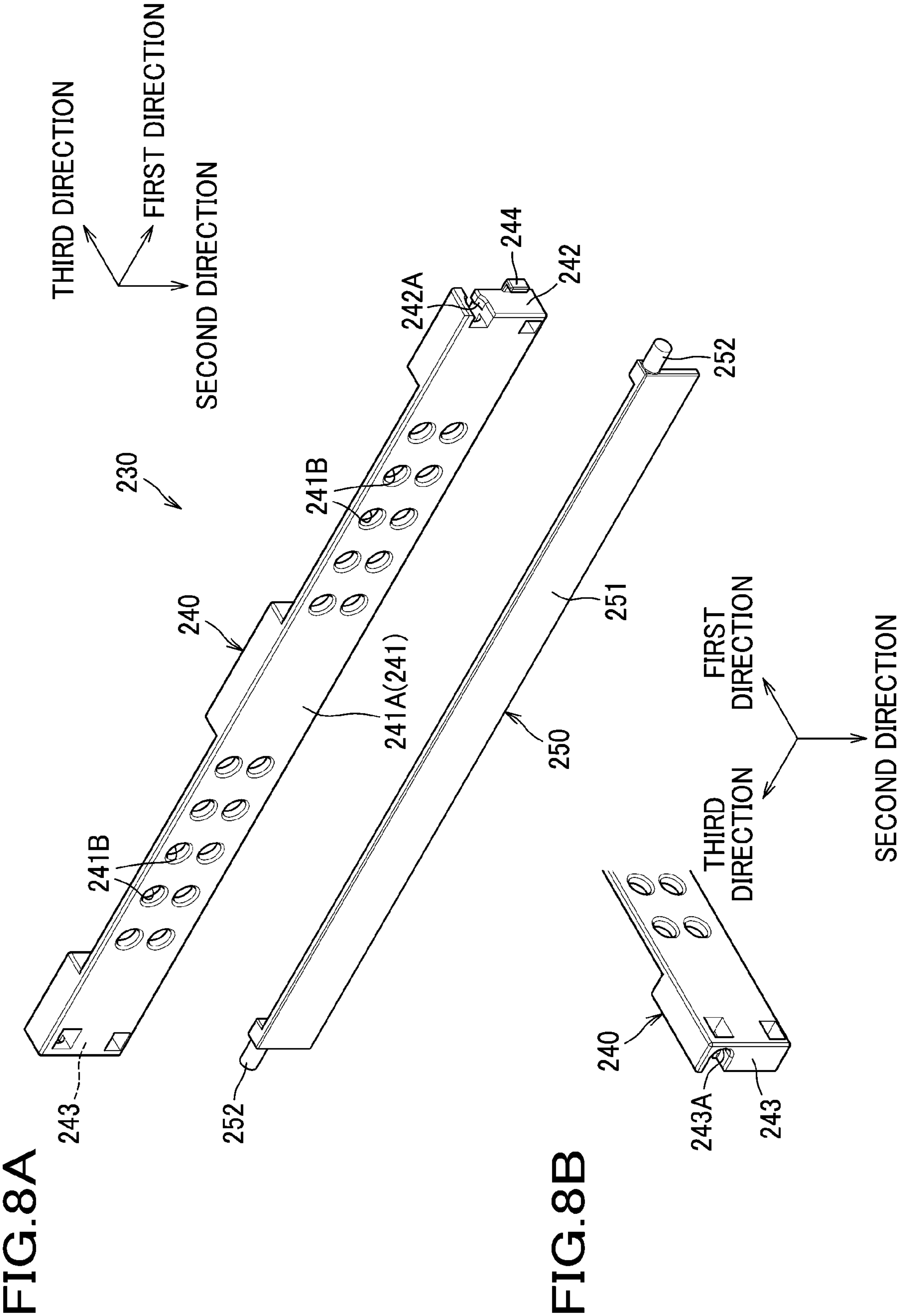
FIG. 8A is an exploded perspective view of the shutter.
FIG. 8B is a perspective view of a second end of the first shutter facing toward a second side in a first direction.

As shown in FIG. 3 and FIG. 4, the shutter 230 is a member configured to open and close the opening 101 of the fixing device housing 100. As shown in FIG. 7 and FIG. 8A, the shutter 230 includes a first shutter 240 and a second shutter 250.

Figure 10A:
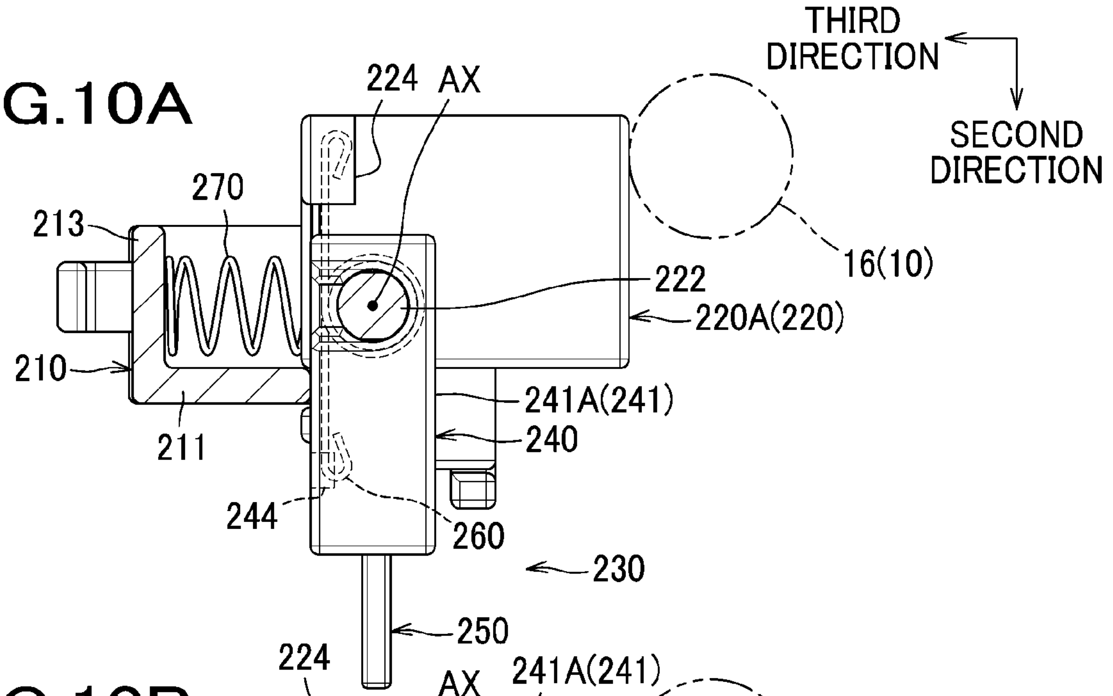
FIG. 10A is a cross-sectional view taken along line X-X of FIG. 6 or FIG. 11, showing a state in which a moving member is located in a first positon.
Figure 10B:
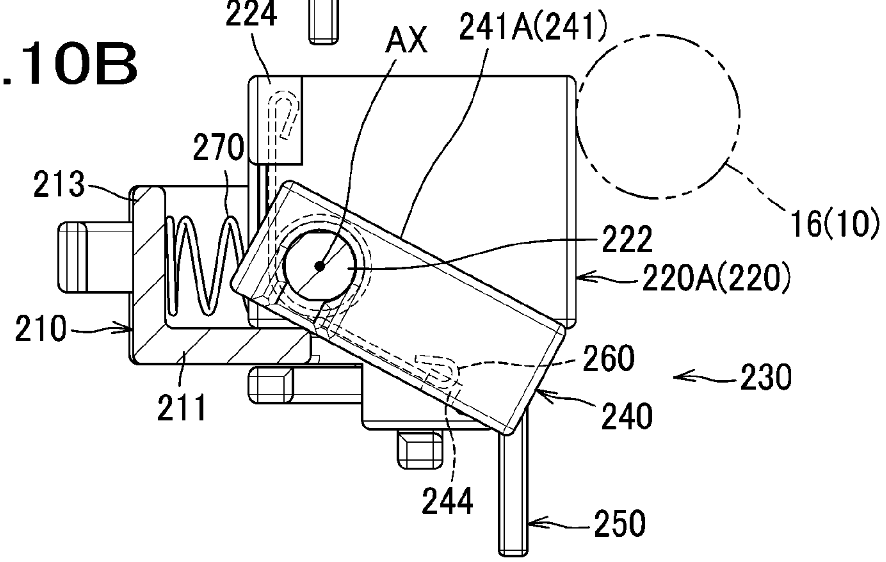
FIG. 10B is a cross-sectional view taken along line X-X of FIG. 6 or FIG. 11, showing a state in which the moving member is located between the first positon and a second position.
Figure 10C:
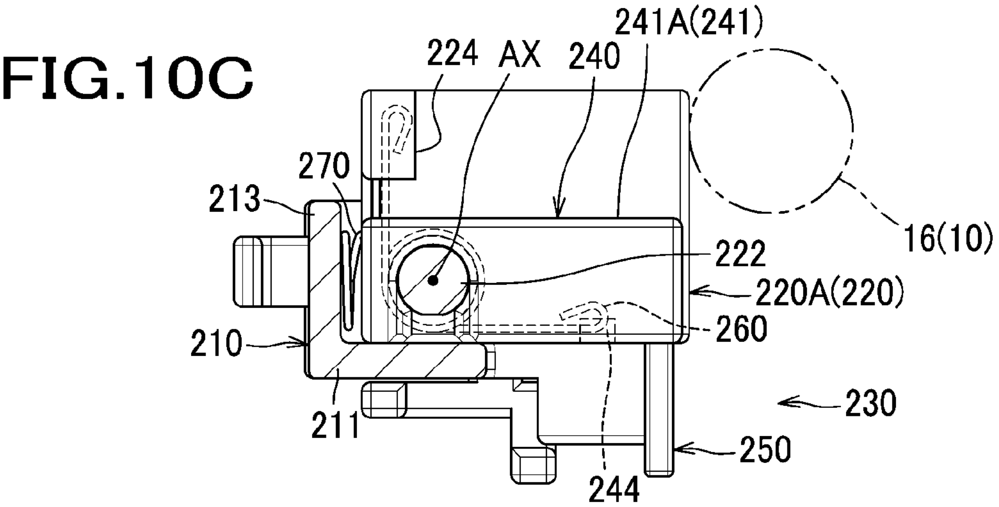
FIG. 10C is a cross-sectional view taken along line X-X of FIG. 6 or FIG. 11, showing a state in which the moving member is located in the second position.

As shown in FIGS. 10A to 10C, the first shutter 240 is rotatably supported by the two moving members 220. Thereby, a rotation axis AX of the first shutter 240 is movable together with the moving members 220 in the third direction. The second shutter 250 is rotatably supported by the first shutter 250.

The first shutter 240 is rotatable and thus rendered switchable between a first posture shown in FIG. 10A and a second posture shown in FIG. 10C. Specifically, the first shutter 240 is configured to open by rotating from the posture in FIG. 10A, through the posture in FIG. 10B, and finally to the posture in FIG. 10C. Also, the first shutter 240 is configured to close by rotating from the posture in FIG. 10C, through the posture in FIG. 10B, and finally to the posture in FIG. 10A. The second shutter 250 is caused to rotate by gravity in accordance with the opening and closing of the first shutter 240. The first shutter 240 in the first posture extends downward from the bosses 222 of the moving members 220. The first shutter 240 in the second poster extends in the direction toward the second side in the third direction from the bosses 222. The first shutter 240 in the second posture is located above the opening 101 shown in FIG. 3.

The first shutter 240 is in the first posture when the shutter 230 is in the closed state. The first shutter 240 is in the second posture when the shutter 230 is in the open state.

As shown in FIGS. 8A and 8B, the first shutter 240 includes a plate-shaped portion 241, a first side wall portion 242, a second side wall portion 243, and a spring hooking portion 244.

The plate-shaped portion 241 is a plate-shaped part, having a dimension in the first direction greater than dimensions in the other directions. The plate-shaped portion 241 includes an outer surface 241A and a plurality of through holes 241B.

As shown in FIG. 10A, the outer surface 241A is a surface that faces in the direction toward the second side in the third direction when the first shutter 240 is in the first posture, i.e. when the shutter 230 is in the closed state. As shown in FIG. 10C, the outer surface 241A faces upward when the first shutter 240 is in the second posture, i.e. when the shutter 230 is in the open state.

Referring back to FIG. 8A and FIG. 8B, the through holes 241B are through holes that extend through the plate-shaped portion 241 in the third direction when the shutter 230 is in the closed state. Therefore, the through holes 241B extend through the plate-shaped portion 241 in an up-down direction when the shutter 230 is in the open state.

The first side wall portion 242 is located at an end of the plate-shaped portion 241 facing toward the first side in the first direction. The first side wall portion 242 includes a hole 242A that extends through the first side wall portion 242 in the first direction. A part of the inner surface of the hole 242A is open in the third direction to render the first shutter 240 removable from a mold after injection molding of the first shutter 240.

The hole 242A is a hole into which the boss 222 of the first moving member 220A is inserted. The first side wall portion 242 is rotatably supported by the boss 222 of the first moving member 220A.

As shown in FIG. 8B, the second side wall portion 243 is located at an end of the plate-shaped portion 241 facing toward the second side in the first direction. The second side wall portion 243 includes a hole 243A that extends through the second side wall portion 243 in the first direction. An part of the inner surface of the hole 243A is open in the third direction to render the first shutter 240 removable from a mold after injection molding of the first shutter 240.

The hole 243A is a hole into which the boss 222 of the second moving member 220B is inserted. The second side wall portion 243 is rotatably supported by the boss 222 of the second moving member 220B.

The spring hooking portion 244 is a part for a shutter spring 260 (which will be described below) to be hooked thereon. The spring hooking portion 244 is disposed at the first side wall portion 242.

As shown in FIG. 8A, the second shutter 250 includes a plate-shaped portion 251 and two bosses 252.

The plate-shaped portion 251 is a plate-shaped part, having a dimension in the first direction greater than dimensions in the other directions.

Figure 9:
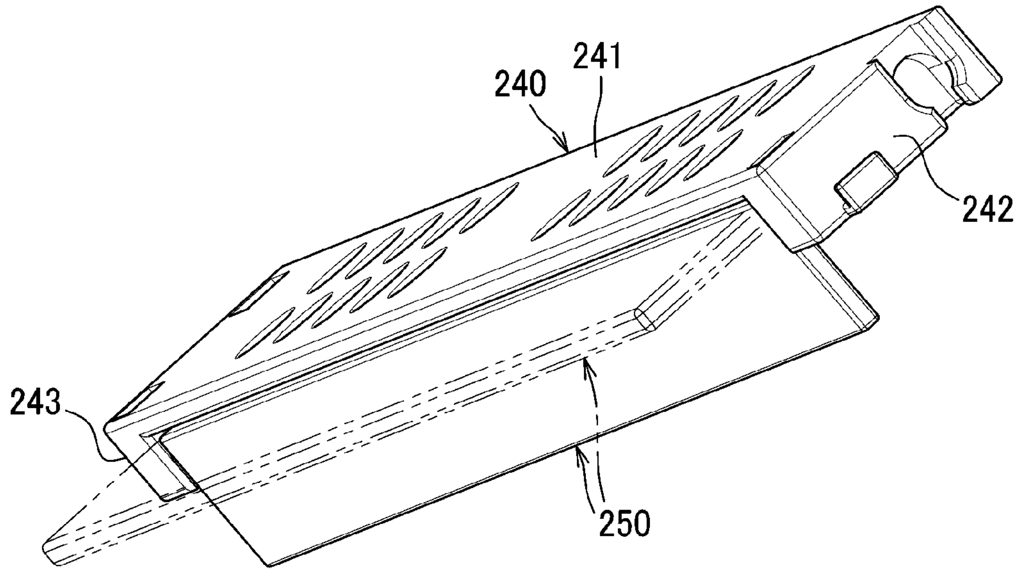
FIG. 9 is a perspective view showing a motion of a second shutter relative to a first shutter.

One boss 252 is disposed on each of two ends of the plate-shaped portion 251 in the first direction. Each boss 252 protrudes from the plate-shaped portion 251 in the first direction. As shown in FIG. 8A and FIG. 9, two bosses 252 are rotatably supported by the first side wall 242 and the second side wall 243 of the first shutter 240, respectively, so that the second shutter 250 is rotatable.

As shown in FIGS. 10A to 10C, the second shutter 250 is suspended from the first shutter 240. The second shutter 250 is oriented approximately parallel to the up-down direction with its tip pointing downward by gravity regardless of the posture of the first shutter 240.

As shown in FIG. 10A, the first shutter 240 is in the first posture and suspended from the moving members 220 when the moving members 220 are located in their first position. In other words, the shutter 230 is closed when the moving members 220 are located in their first positions.

When the moving members 220 are located in their first positions, the opposing portion 211 of the support member 210 faces the first shutter 240 in one of the directions of movement of the moving members 220, i.e. in the third direction. In the present embodiment, when the moving members 220 are in their first positions, the opposing portion 211 is in contact with the first shutter 240. The opposing portion 211 is located apart from the rotation axis AX of the first shutter 240 in the second direction perpendicular to the third direction. Specifically, the opposing portion 221 is located below the rotation axis AX.

Thereby, when the moving members 220 are caused to move from their first positions to their second positions, a part of the first shutter 240 below the rotation axis AX is pushed by the opposing portion 211, and the first shutter 2440 is caused to rotate from the first posture to the second posture. In other words, in a process of movement of the moving members 220 from their first positions to their second positions, the first shutter 240 is pushed by the opposing portion 211, and thereby caused to rotate so that the opening 101 of the fixing device housing 100 is opened. Therefore, as shown in FIG. 10C, the shutter 230 is open when the moving members 220 are located in their second positions.

Figure 11:
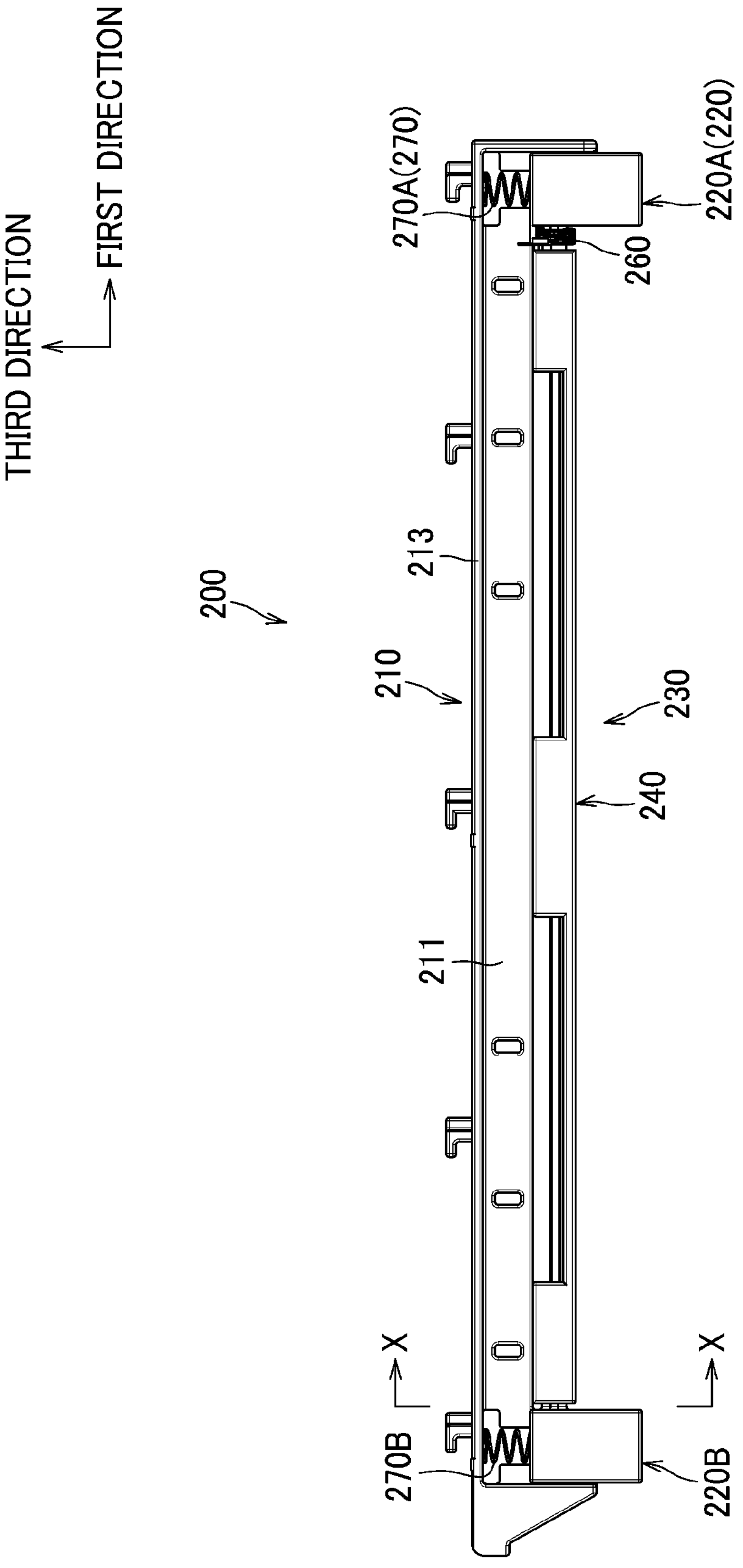
FIG. 11 is a plan view of the shutter unit as viewed from above.

As shown in FIG. 10 and FIG. 11, the shutter unit 200 further comprises a shutter spring 260 and two move springs 270.

The shutter spring 260 is a spring configured to bias the shutter 230 in such a direction as to cause the shutter 230 to close the opening 101. In the present embodiment, the shutter spring 260 is a torsion spring. The shutter spring 260 biases the first shutter 240 in such a direction as to cause the first shutter 240 to rotate form the second posture to the first posture.

As shown in FIG. 11, the shutter spring 260 is located between the first shutter 240 and the first moving member 220A. As shown in FIGS. 10A to 10C, one end of the shutter spring 260 is hooked on the spring hooking portion 224 of the first moving member 220A.

The other end of the shutter spring 260 is hooked on the spring hooking portion 244 of the first shutter 240. The boss 222 of the first moving member 220A is inserted in the coil portion of the shutter spring 260 and supports the coil portion. The shutter spring 260 is configured to bias the first shutter 240 in the clockwise direction of FIGS. 10A to 10C, such that the first shutter 240 is caused to move from the second posture shown in FIG. 10C toward the first posture shown in FIG. 10A.

As shown in FIG. 11, the move springs 270 are springs each configured to bias the corresponding moving member 220 from the second position toward the first position. In the present embodiment, each move spring 270 is a helical compression spring.

In the following descriptions, the move spring 270 configured to bias the first moving member 220A will also be referred to as first move spring 270A, and the move spring 270 configured to bias the second moving member 220B will also be referred to as second move spring 270B.

The first move spring 270A is located between the first wall 213 of the support member 210 and the first moving member 220A. The second move spring 270B is located between the first wall 213 of the support member 210 and the second moving member 220B.

Figure 12A:
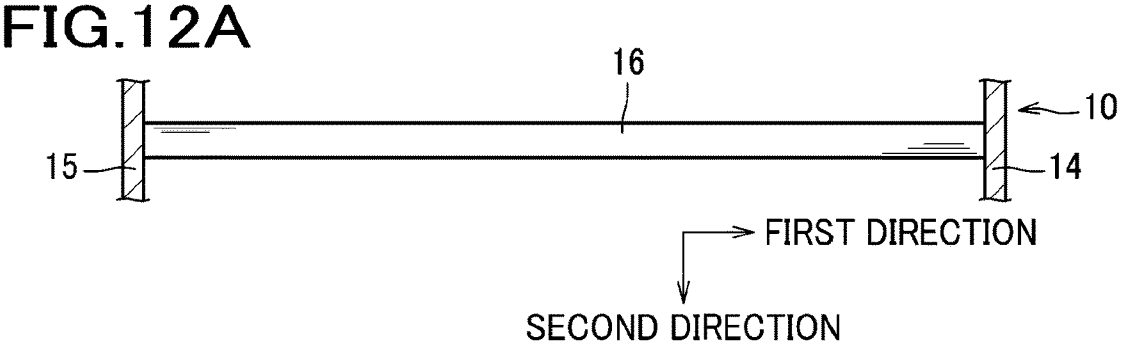
FIG. 12A is an illustration showing a relationship between a shaft and side frames.

As shown in FIG. 12A, the main housing 10 further includes a first side frame 14, a second side frame 15, and a shaft 16 as an example of a contact portion. The first side frame 14 and the second side frame 15 are made of plastic or the like. The shaft 16 is made of metal or the like.

The first side frame 14 is located at one end of the main housing 10 facing toward the first side in the first direction.

The second side frame 15 is located at the other end of the main housing 10 facing toward the second side in the first direction. The first side frame 14 is located apart from the second side frame 15 in the first direction.

The shaft 16 extends in the first direction. The shaft 16 connects the first side frame 14 and the second side frame 15.

Figure 12B:
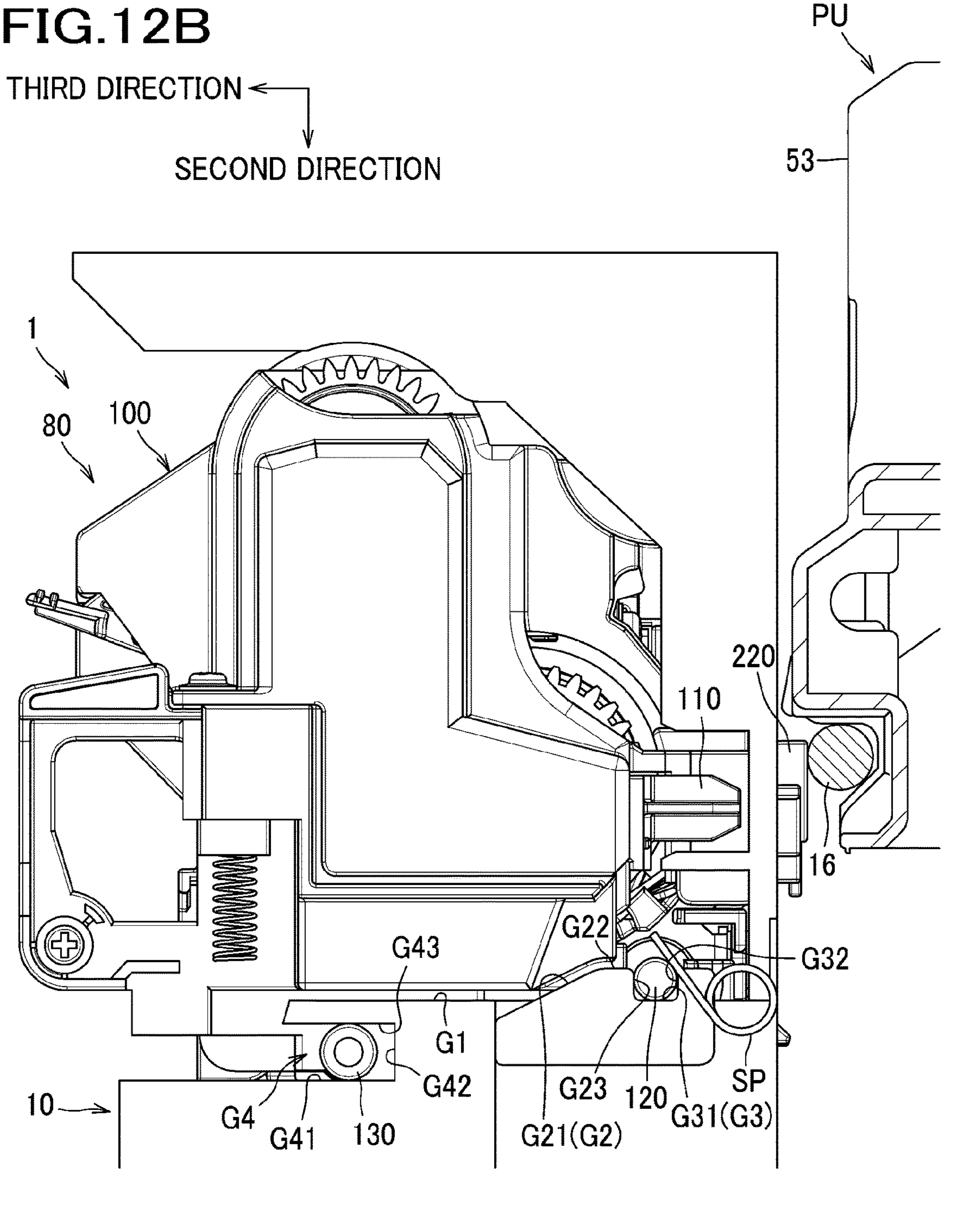
FIG. 12B is an illustration showing a relation between a shaft, process unit, and the fixing device.

As shown in FIG. 12B, in a state that the fixing device 80 is attached to the main housing 10, the shaft 16 is in contact with the moving members 220. The shaft 16 in contact with the moving members 220 receives the biasing force of the move springs 270. The shaft 16 contacts the moving members 220 and thereby retains the moving members 220 in the second position.

In a state that the process unit PU is attached to the main housing 10, the shaft 16 is in contact with the process unit PU. Specifically, the shaft 16 is in contact with the drum frame 53. The drum frame 53 is biased toward the first side in the third direction by a spring not shown in the drawings. The positioning of the drum frame 53 in the third direction is optimized by the shaft 16 with which the drum frame 53 is kept in contact.

The fixing device 80 is attachable to and detachable from the main housing 10 through the opening provided at the rear side of the main housing 10 in directions parallel to the third direction. The fixing device housing 100 includes a protruding portion 110, a reference shaft 120, and a rotation stopping portion 130.

The protruding portion 110 is located at a surface of the fixing device housing 100 facing in the direction toward the second side in the third direction. The protruding portion 110 extends in the direction toward the second side in the third direction. A cross section of the protruding portion 110 perpendicular to the third direction has a shape of a cross.

The reference shaft 120 and the rotation stopping portion 130 are cylindrical bosses. The reference shaft 120 and the rotation stopping portion 130 are located at a surface (right side surface) of the fixing device housing 100 facing in the direction toward the second side in the first direction. The reference shaft 120 and the rotation stopping portion 130 protrude from the right-side surface of fixing device housing 100 in the direction toward the second side in the first direction.

The reference shaft 120 is a part that contacts the main housing 10 and thereby positions the fixing device housing 100 in relation to the main housing 10 in the second direction and in the third direction. The reference shaft 120 is located in a position shifted from the position of the rotation stopping portion 130 in the direction toward the second side of the third direction. A part of the reference shaft 120 is within the range of the protruding portion 110 in the third direction.

The rotation stopping portion 130 is a part that contacts the main housing 10 and thereby stops the rotation of the fixing device 80 about the reference shaft 120. The rotation stopping portion 130 is located in a position below the position of the reference shaft 120. When seen from a side in the first direction, a distance from a center of the rotation stopping portion 130 to a center of the reference shaft 120 is larger than a distance from the center of the reference shaft 120 to the contact point of the shaft 16 and the moving member 120.

Figure 13:
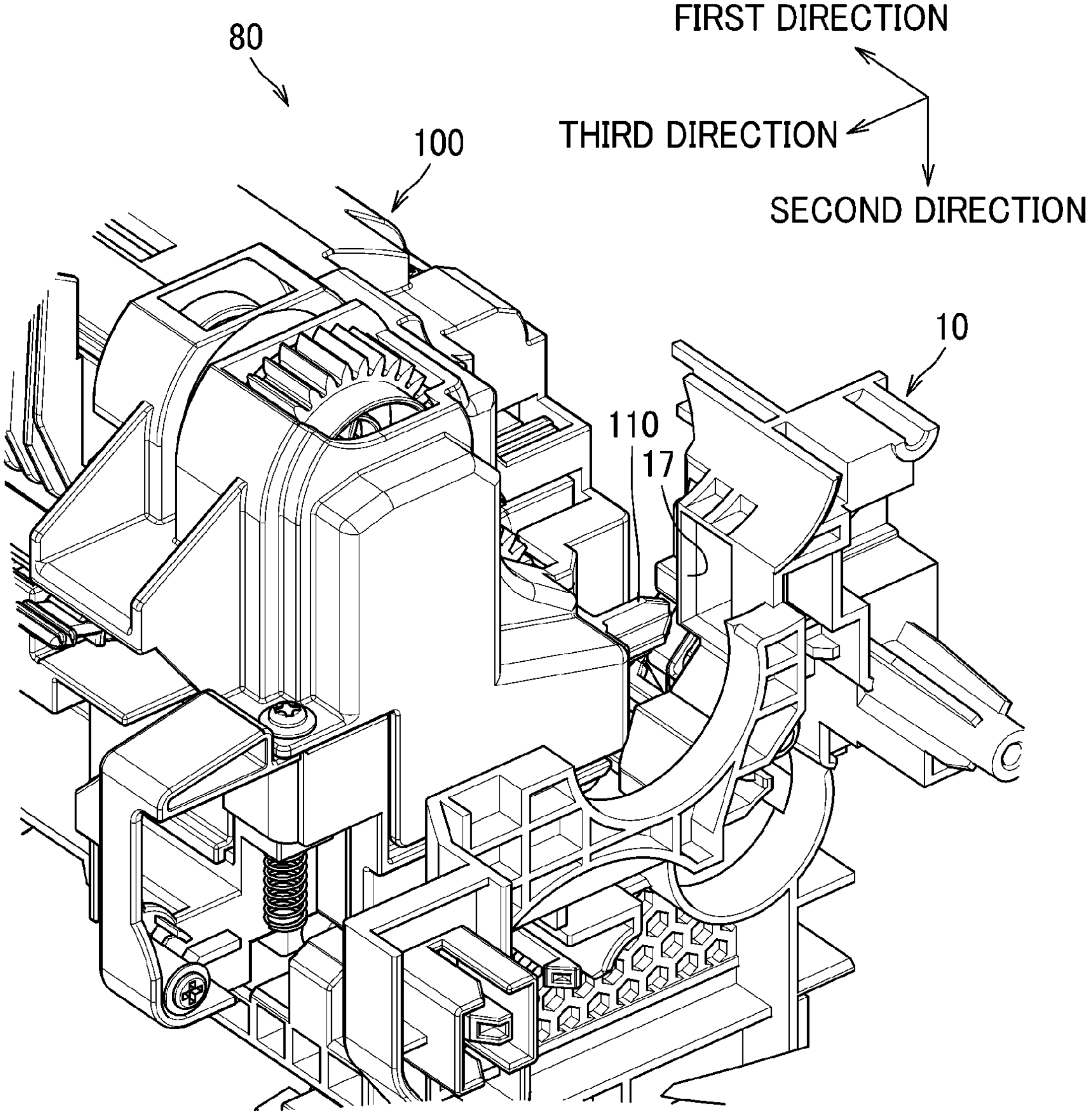
FIG. 13 is a perspective view showing a relationship between a protrusion of a fixing device housing and a long hole of the main housing.

As shown in FIG. 13, the main housing 10 includes a long hole 17 elongate in the second direction. The fixing device 80 is located in the first direction by the long hole 17 in which the protruding portion 110 of the fixing device housing 100 is inserted.

As shown in FIG. 12B, the main housing 10 includes a guide surface G1, a protrusion G2, a first recess G3, and a second recess G4.

The guide surface G1 is a surface that guides the reference shaft 120 of the fixing device 80. The guide surface G1 is perpendicular to the second direction. The guide surface G1 contacts the reference shaft 120 from below.

The protrusion G2 protrudes upward from the guide surface G1. The protrusion G2 includes an inclined surface G21, an end surface G22, and a reference surface G23.

The inclined surface G21 is located at the one side of the protrusion G2 facing in a direction toward the first side in the third direction. In other words, the inclined surface G21 is located upstream of the protrusion G2 in a direction of attachment of the fixing device 80. The inclined surface G21 is inclined relative to the guide surface G1. Specifically the inclined surface G21 is configured to ascend in the direction of attachment of the fixing device 80.

The end surface G22 extends downstream from a downstream end of the inclined surface G21 in the direction of attachment of the fixing device 80.

The reference surface G23 extends downward from a downstream end of the end surface G22 in the direction of attachment of the fixing device 80. The reference surface G23 is perpendicular to the third direction, i.e. the direction parallel to the directions in which the moving members 220 move. The reference surface G23 is located downstream of the protrusion G2 in the direction of attachment of the fixing device 80. The reference surface G23 is in contact with the reference shaft 120 in the state that the fixing device 80 is attached to the main housing 10.

The first recess G3 is recessed downward from the end surface G22 of the protrusion G2. In the state that the fixing device 80 is attached to the main housing 10, the reference shaft 120 is inserted in the first recess G3. The first recess G3 includes the aforementioned reference surface G23, a second reference surface G31, and a stopper surface G32.

The second reference surface G31 is non-parallel to the reference surface G23. Specifically, the second reference surface G31 is perpendicular to the reference surface G23. The second reference surface G31 extends from the lower end of the reference surface G23 downstream in the direction of attachment of the fixing device 80. The second reference surface G31 is perpendicular to the second direction. The second reference surface G31 is in contact with the reference shaft 120 in the state that the fixing device 80 is attached to the main housing 10.

The stopper surface G32 extends upward from a downstream end, located at an extremity facing in the direction of attachment of the fixing device 80, of the second reference surface G31. The stopper surface G32 restrains the reference shaft 120 from moving downstream in the direction of attachment of the fixing device 80, in the state that the fixing device 80 is attached to the main housing 10.

The second recess G4 is a recess in which the rotation stopping portion 130 is inserted in the state that the fixing device 80 is attached to the main housing 10. The second recess G4 opens upstream in the direction of attachment of the fixing device 80. The second recess G4 includes a restraining surface G41, a bottom surface G42, and a second restraining surface G43.

The restraining surface G41 is a surface that restrains the rotation stopping portion 130 from rotating about the reference shaft 120. The restraining surface G41 is perpendicular to the second direction. The retraining surface G41 contacts the rotation stopping portion 130 from below in the state that the fixing device 80 is attached to the main housing 10. The restraining surface G41 extends farther, than the second restraining surface G43, in the direction opposite to the direction of attachment of the fixing device 80.

The bottom surface G42 extends upward from the downstream end, located at an extremity facing in the direction of attachment of the fixing device 80, of the restraining surface G41.

The second restraining surface G43 extends from the upper end of the bottom surface G42 in a direction opposite to the direction of attachment of the fixing device 80. The restraining surface G43 contacts the rotation stopping portion 130 to thereby restrain the rotation stopping portion 130 from moving upwards.

The image forming apparatus 1 further comprises an attaching spring SP.

The attaching spring SP is a spring for attaching the fixing device 80 to the main housing 10. In the present embodiment, the attaching spring SP is a torsion spring. The attaching spring SP biases the fixing device 80 toward the main housing 10.

Specifically, one end portion of the attaching spring SP contacts the reference shaft 120. The other end portion of the attaching spring SP contacts the main housing 10. The attaching spring SP biases the reference shaft 120 toward the reference surface G23 and the second reference surface G31.

Next, operations of the members performed when the fixing device 80 is attached to and detached from the main housing 10 will be described.

Figure 14A:
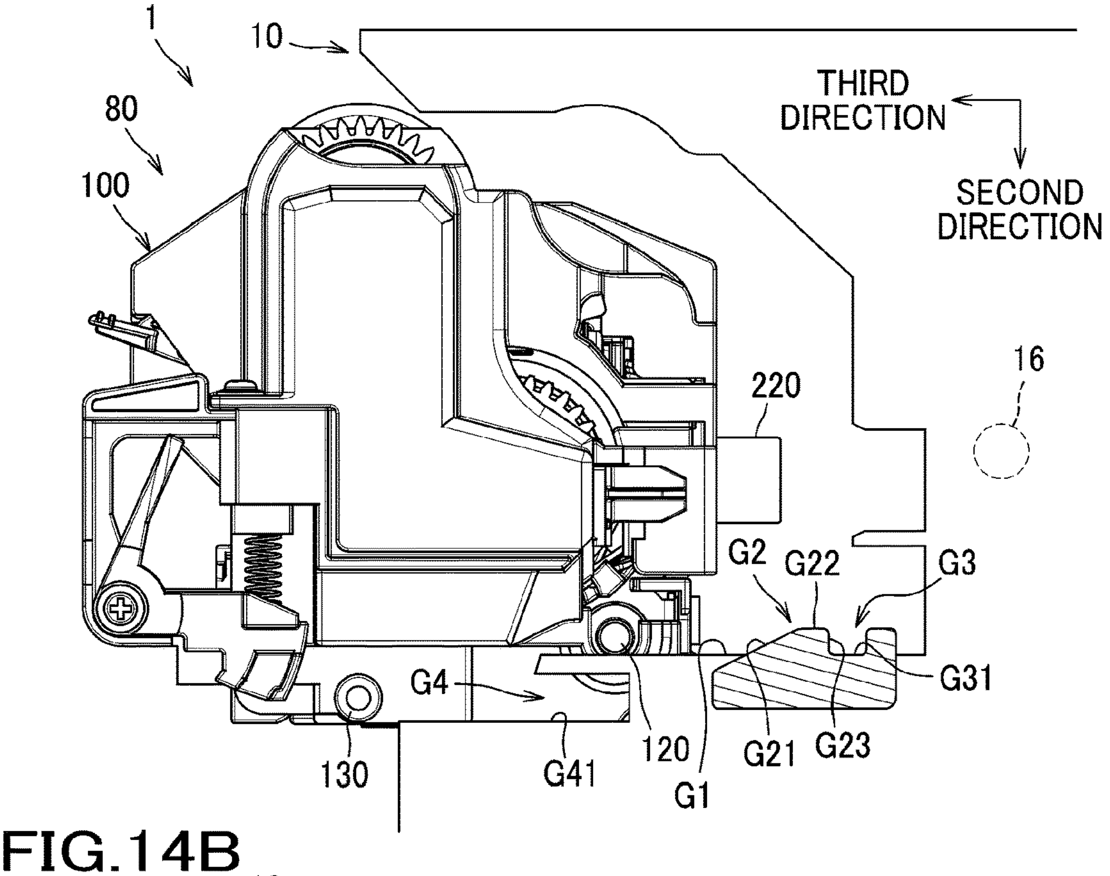
FIG. 14A is an illustration for explaining a process of attaching the fixing device, showing a state in which a reference shaft of the fixing device is guided by a guide surface.

As shown in FIG. 2, in a state that the fixing device 80 is detached from the main housing 10, the moving members 220 are located in their first positions. As shown in FIG. 14A, in the process of attaching the fixing device 80 to the main housing 10, the reference shaft 120 contacts the guide surface G1 and is guided by the guide surface G1.

Figure 14B:
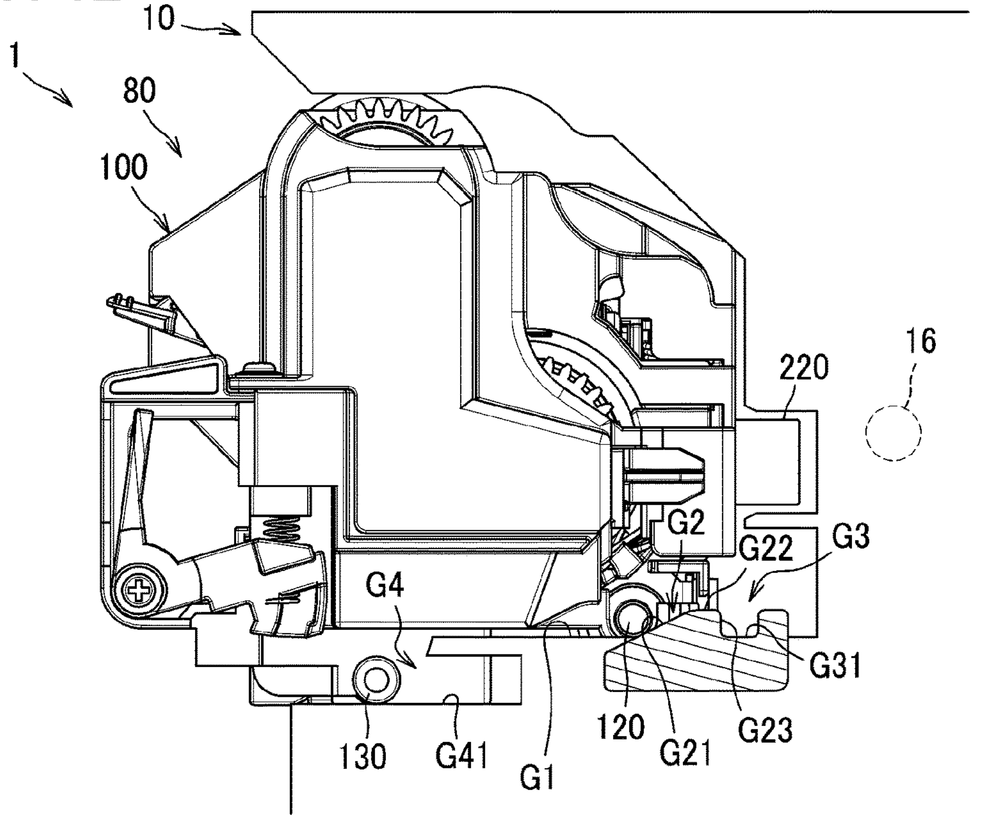
FIG. 14B is an illustration for explaining the process of attaching the fixing device, showing a state in which the reference shaft of the fixing device has reached an inclined surface.
Figure 15A:
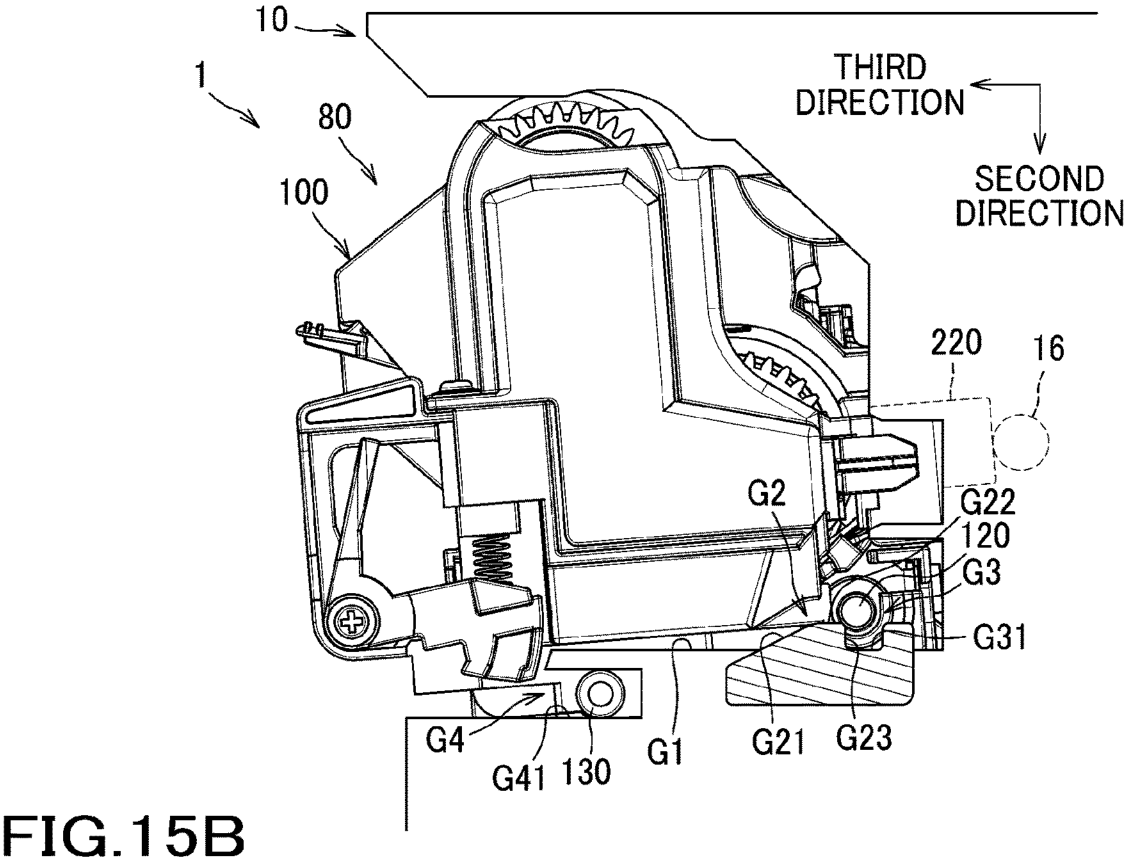
FIG. 15A is an illustration for explaining the process of attaching the fixing device, showing a state in which the reference shaft of the fixing device has separated from an end surface.

As shown in FIG. 14B, in the process of attaching the fixing device 80 to the main housing 10, the rotation stopping portion 130 contacts the restraining surface G41 and is guided by the restraining surface G41. When the reference shaft 120 contacts the inclined surface G21, the reference shaft 120 moves obliquely upward and downstream in the direction of attachment of the fixing device 80. Thereby, as shown in FIG. 15A, the fixing device 80 is inserted into the main housing 10 while taking a posture in which the surface of the fixing device 80, facing downstream in the direction of attachment of the fixing device, orients obliquely upwards.

Figure 15B:
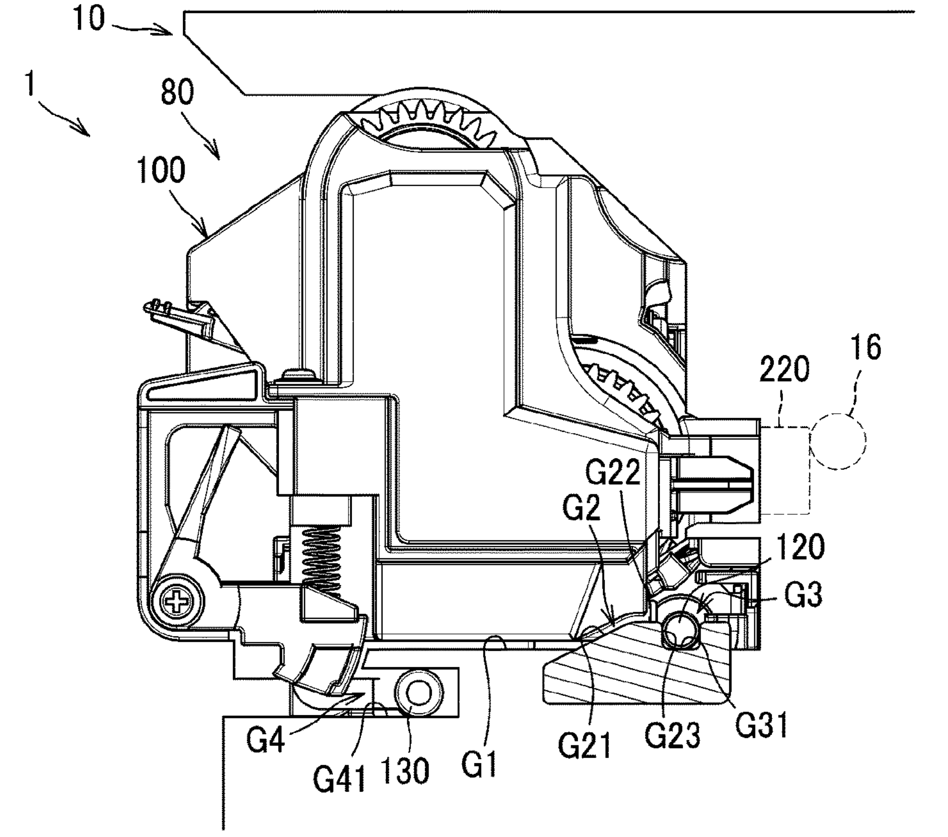
FIG. 15B is an illustration for explaining the process of attaching the fixing device, showing a state in which the reference shaft of the fixing device is inside a first recess.

The reference shaft 120 is guided by the inclined surface G21, and thereafter guided by the end surface G22 in a direction parallel to the third direction. When the reference shaft 120 is detached from the end surface G22, the reference shaft 120 is inserted in the first recess G3 by gravity and the biasing force of the attaching spring SP, as shown in FIG. 15B and FIG. 12B. Specifically, in the process of attaching the fixing device 80 to the main housing 10, the reference shaft 120 contacts the attaching spring SP and thereby causes the spring SP to deform. Thereby, the reference shaft 120, after detached from the end surface G22, is biased downward by gravity and the biasing force of the attaching spring SP, and is thereby is inserted into the first recess G3. At this time, the rotation stopping portion 130 is inserted in the second recess G4.

When the user releases the fixing device 80, the reference shaft 120 is biased toward the reference surface G23 by the biasing force of the attaching spring SP, and the reference shaft 120 is biased toward the second reference surface G31 by gravity and the biasing force of the attaching spring SP. Therefore, the reference shaft 120 is positioned in the second direction and in the third direction by the reference shaft 120 being pushed against the reference surface G23 and the second reference surface G31. According to the operation described above, the process of attaching the fixing device 80 into the main housing 10 is completed.

As shown in FIG. 10A, in the process of attaching the fixing device 80 into the main housing 10, the moving members 220 contact the shaft 16. After the moving members 220 contact the shaft 16, fixing device 80 is pushed further inward of the main housing 10. Then, as shown in FIGS. 10A to 10C, the shaft 16 causes the moving members 220 to move from their first positions to their second positions, and thereby opens the shutter 230 against the biasing forces of the shutter spring 260 and the move springs 270.

Specifically, the moving members 220 move, together with the rotation axis AX of the first shutter 240, from their first positions to their second positions against the biasing force of the move springs 270. In the process of movement of the rotation axis AX from the first position to the second position, the opposing portion 211 pushes the first shutter 240 in a direction toward the second side in the third direction against the biasing force of the shutter spring 260. Thereby, the first shutter 240 is rotated from the first posture to the second posture.

The second shutter 250, rotatable relative to the first shutter 240, keeps a posture parallel to the up-down direction by the action of gravity, while the first shutter 240 rotates from the first posture to the second posture. Therefore, the second shutter 250 is in a posture angled 90 degrees with the first shutter 240 when the first shutter 240 is in the second posture.

In the state that the fixing device 80 is attached to the main housing 10, the moving members 220 contact the shaft 16 and thus retained in their second positions. At this time, the move springs 270 bias the moving members 220 in the direction toward the second side in the third direction. Therefore, a direction of forces applied to the shaft 16 from the moving members 220 is opposite to a direction of a force applied to the shaft 16 from the process unit PU.

As shown in FIG. 12B, in the state that the fixing device 80 is attached to the main housing 10, the fixing device housing 100 of the fixing device 80 receives a reaction force in a direction toward the first side in the third direction from the shaft 16. Specifically, the move springs 270 biases a part of the fixing device 80 above the reference shaft 120 in a direction toward the second side in the third direction.

Therefore, in the state that the fixing device 80 is attached to the main housing 10, the move springs 270 bias the reference shaft 120 in a direction toward the first side in the third direction, and thereby push the reference shaft 120 against the reference surface G23. Since the reference shaft 120 is pushed against the reference surface G23 by the biasing force of the move springs 270, the reference shaft can be positioned in the third direction with higher accuracy.

The move springs 270 push the part of the fixing device 80 above the reference shaft 120 in contact with the reference surface G23, to thereby bias the fixing device 80 so that the fixing device 80 is rotated in a counterclockwise direction in the drawings. Therefore, in a state that the fixing device 80 is attached to the main housing 10, the move springs 270 bias the rotation stopping portion 130 toward the restraining member G41. Thus, the rotation stopping portion 130 is positioned in the second direction by the rotation stopping portion 130 pressed against the restraining surface G41.

In the process of detaching the fixing device 80 from the main housing 10, the shutter 230 is caused to close by the biasing forces of the shutter spring 260 and the move springs 270. Specifically, when the fixing device 80 is detached from the main housing 10, the user inclines the fixing device 80 to cause the surface of the fixing device facing downstream in the direction of attachment of the fixing device 80 to orient obliquely upward, see FIG. 15B and FIG. 15A in this sequence, so that the reference shaft 120 is detached from the first recess G3. Thereafter, the user moves the fixing device 80 in a direction toward the first side in the third direction to detach the fixing device 80 from the main housing 10.

In the process of detaching the fixing device 80 from the main housing 10, the moving members 220 move in a direction away from the shaft 16, and thereby move from their second positions to their first positions by the biasing force of the move springs 270, see FIG. 10C, FIG. 10B, and FIG. 10A in this sequence. In the process of moving the moving parts 220 from their second positions to their first positions, the first shutter 240 is caused to rotate from the second posture to the first posture by the biasing force of the shutter spring 260.

The second shutter 250, rotatable relative to the first shutter 240, keeps a posture parallel to the up-down direction by the action of gravity, while the first shutter 240 rotates from the second posture to the first posture. Therefore, the first shutter 240 and the second shutter 250 are both in a posture parallel to the up-down direction when the first shutter 240 is in the first posture.

According to the above-described embodiment, the following advantageous effects can be obtained.

Since the moving members 220 are configured to support the shutter 230 in a manner that allows the shutter 230 to rotate, the rotation axis AX of the shutter 230 can be moved into the fixing device housing 100 when the moving members 220 move from their first positions to their second positions. Therefore, an amount of protrusion of the part of the shutter 230 protruding outside of the fixing device housing 100 when the shutter 230 is open can be reduced.

Since the shutter spring 260 is configured to bias the shutter 230, the shutter 230 can be closed by the action of the shutter spring 260.

Since the move springs 270 are configured to bias the moving members 220, the moving members 220 can be returned to their first positions by the action of the move springs 270.

Since the moving members 220 located in the first positions are configured to protrude from the outer surface 102 of the fixing device housing 100, the moving member 220 can be pushed from outside of the fixing device housing 100 with increased ease.

Since the second shutter 250 is configured to be rotatable relative to the first shutter 240, the second shutter 250 is angled relative to the first shutter 240 when the shutter 230 is in the open state, and therefore the amount of protrusion of the shutter 230 protruding from the fixing device housing 100 can be reduced.

Since the through holes 241B are configured to extend through the shutter 230 in the up-down direction when the shutter 230 is in the open state, the heat inside the fixing device housing 80 can be dissipated upward through the through holes 241B of the shutter 230.

Since the shutter 230 is opened and closed only when the fixing device 80 is attached to and detached from the main housing 10, the wearing out of an actuator mechanism for moving the shutter 230 can be restrained.

Since the shaft 16 is configured to contact the process unit PU, the shaft 16 configured to contact the moving members 220 can also be used to position the process unit PU.

Since the direction of the force applied to the shaft 16 from the moving members 220 is opposite to the direction of the force applied to the shaft 16 from the process unit PU, the biasing force of the move springs 270 and the force from the process unit PU counterbalance each other. Thus, shaft 16 can be restrained from deforming.

Since the position of the moving members 220 in the first direction can be shifted toward the inside in the first direction by causing the shaft 16 extending in the first direction to contact the moving members 220, the fixing device 80 can be restrained from increasing in size in the first direction.

Since the shaft 16 configured to connect the first side frame 14 and the second side frame 15 is provided, the shaft 16 is less prone to deform when receiving the force from the process unit PU, etc., and thereby the process unit PU, etc., can be positioned with higher precision.

Since the image forming apparatus 1 is configured to include the reference shaft 120, the reference surface G23, the second reference surface G31, and the restraining surface G41, in the state that the fixing device 80 is attached to the main housing 10, the reference shaft 120 contacts the reference surface G23 and the second reference surface G31, whereby the reference shaft 120 is positioned in two directions. Since the move springs 270 bias the shaft 120 toward the reference surface G23, the contact of the reference shaft 120 with the reference surface G23 is ensured. Since the move springs 270 bias the rotation stopping portion 130 toward the restraining surface G41, the contact of the rotation stopping portion 130 with the restraining surface G41 is ensured by the biasing force of the move springs 270, whereby the fixing device 80 is positioned with precision. From the features described above, it follows that the fixing device 80 can be positioned in the main housing 10 with higher precision.

Since the protrusion G2 is configured to have the inclined surface G21, the reference shaft 120 can smoothly pass the protrusion G2, and the reference shaft 120 can be smoothly guided to the reference surface G23.

Since the attaching spring SP biases the reference shaft 120 toward the reference surface G23, the fixing device 80 can be positioned in the main housing 10 with higher precision by the biasing force of the attaching spring SP.

Since the attaching spring SP biases the reference shaft 120 toward the reference surface G23 and the second reference surface G31, the contact of the reference shaft 120 with the reference surface G23 and the second reference surface G31 can be ensured, thus the fixing device 80 can be positioned relative to the main housing 10 in two directions with higher precision.

Figure 16A:
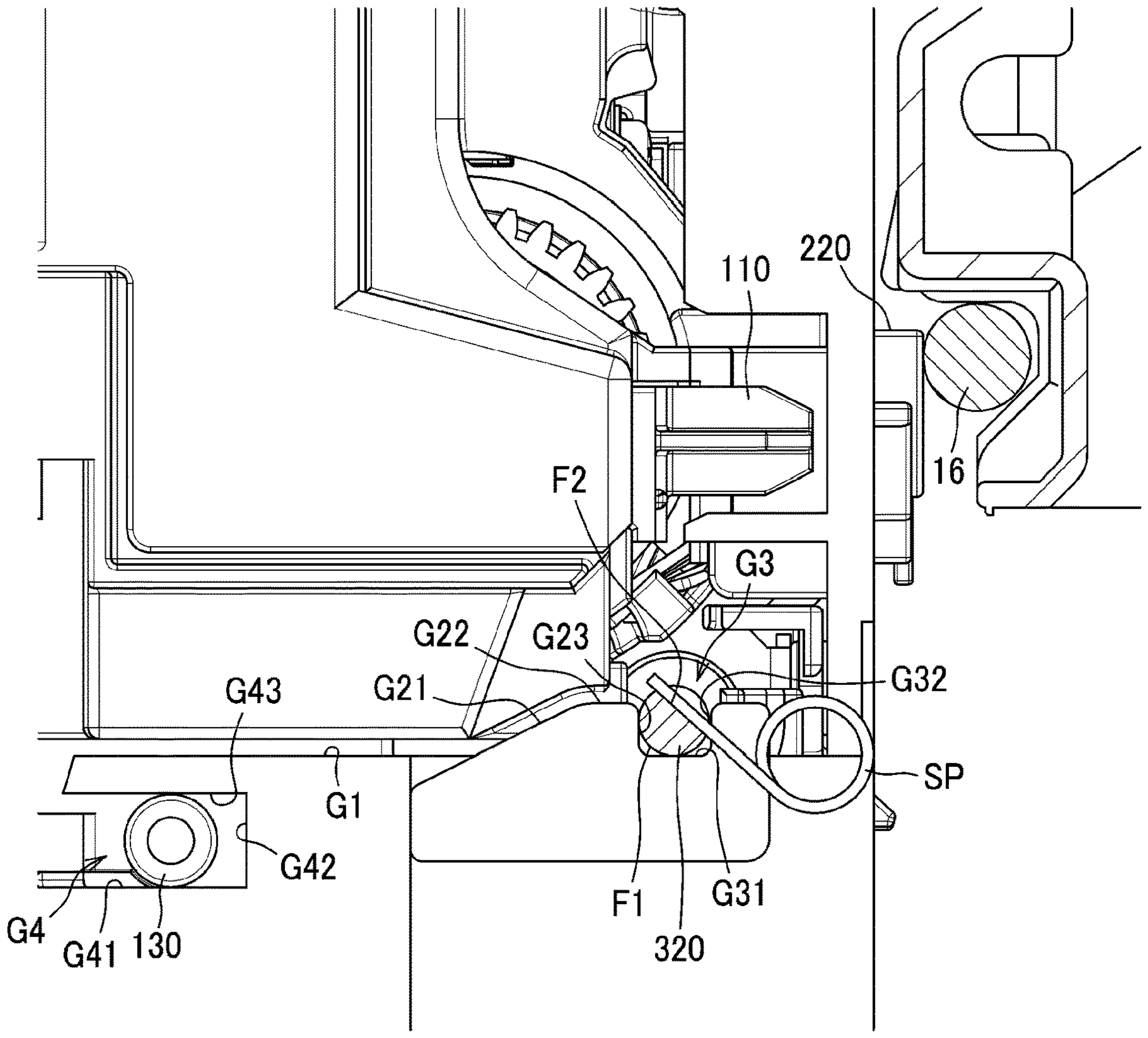
FIGS. 16A and 16B are diagrams showing modified examples of the reference shaft.
Figure 16B:
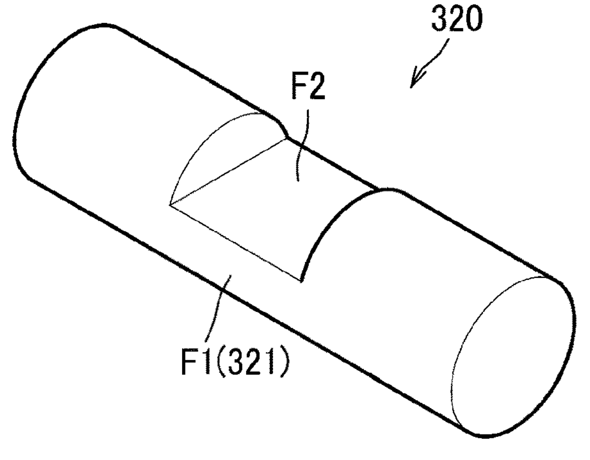

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

As shown in FIGS. 16A and 16B, a reference shaft 320 may include a D-shaped portion 321 having a D-shaped cross section. The D-shaped portion 321 includes a curved surface F1 and a flat surface F2.

The curved surface F1 is a surface extending along a segment of a cylinder the center of which coincides with a rotation axis of the reference shaft 320. The curved surface F1 contacts the reference surface G23 and the second reference surface G31.

The flat surface F2 connects two straight sides of the curved surface F1. The flat surface F2 contacts the attaching spring SP.

The D-shaped portion 321 may be at least a part of the reference shaft 320, as shown in the FIG. 16B. Alternatively, the reference shaft may have a D-shaped cross section along its length.

An opening of the fixing device housing may be an opening through which a sheet from the inside of the fixing device housing passes to the outside of the fixing device housing.

The shutter may be made up of one member or more than three members. When the shutter is made up of one member, the shutter may have a structure described below.

The shutter includes a first part, a second part, and a third part.

The first part is rotatably supported by moving members.

The second part extends from the first part. The second part of the shutter in a closed state extends in a direction non-parallel to directions in which the moving members move.

The third part of the shutter in the closed state extends from an end portion of the second part opposite to an end portion thereof connected to the first part toward an inside of the fixing device housing.

With this configuration, because the third part of the shutter in an open state extends from the second part toward the inside of the fixing device housing, the amount of protrusion of the shutter protruding outward from the fixing device housing can be made smaller.

The image forming apparatus may comprise one moving member, or more than three moving members. When the image forming apparatus comprises one moving member, the moving member may be located at the center of the shutter along the length in the first direction.

When the moving members are located in their first positions, the moving members may not protrude from the outer surface of the fixing device housing. When the moving members are located in their second positions, the moving members may protrude from the outer surface of the fixing device housing or not protrude from the outer surfaced of the fixing device housing.

The opposing portion may be separate from the shutter when the shutter is closed.

The opposing portion may be formed on the fixing device. In this instance, the support member may not include the opposing portion and be configured to only support the moving members in a manner that allows the moving members to rotate.

There may be no support member. In this instance, for example, the moving members may be movably supported by the fixing device housing.

The relationship of protrusions and holes supporting two members in a rotatable or movable manner may be opposite to that described in the above-described embodiment. For example, the shutter may include a boss, and the moving member may include a hole in which this boss is inserted. Likewise, for example, the first shutter may include a boss and the second shutter may include a hole in which this boss is inserted. Likewise, for example, the support member may include a protruding portion and the moving member may include a long hole elongate in the third direction in which this protruding portion is inserted.

The heating member is not limited to a heating roller, and, for example, may be a ceramic heater, or a configuration comprising a belt, a nip plate that contacts the inner surface of the belt, and a heater that heats the belt and the nip plate, or the like.

The pressure member is not limited to a pressure roller, and, for example, may be a configuration comprising a belt and a rubber pad disposed inside of the belt.

The contact portion of the main housing that contacts the moving member is not limited to a shaft, and, for example, may be a part of the side frame.

The image forming apparatus may be monochrome printers, multifunction devices, photocopiers, or the like.

The reference shaft and the rotation stopping portion may not be cylindrical, and, for example, may have a shape of a polygonal prism.

The attaching spring is not limited to a torsion spring, and, for example, may be a leaf spring, a wire spring or the like. Likewise, the attaching spring may not be made of metal, and, for example, may be made of plastic.

The move spring is not limited to a coil spring, and, for example, may be a leaf spring, a wire spring or the like. Likewise, the move spring is not limited to being made of metal, and, for example, may be made of plastic.

The image forming apparatus may be configured to use a magnet instead of the move spring to bias the moving member.

The spring may be a spring that biases the shutter in such a direction as to cause the shutter to close. The spring may for example, be constituted either of the shutter spring or the move spring of the above-described embodiment. When there is no move spring, the moving member may be moved by hand or be electrically motorized. When there is no shutter spring, for example, the shutter may be configured to be caused to rotate and close by gravity when the moving member moves from the second position to the first position. In this instance, the spring biases the moving member toward the first position to bias the part around the rotation axis of the shutter, thus the shutter is biased in such a direction as to cause the shutter to be closed.

For example, an image forming apparatus may be configured to not include the shutter spring and the move spring in the above-described embodiment. In a configuration that does not comprise the shutter spring and the move spring, the moving member may be configured to move from the second position to the first position according as the shutter is caused to rotate and close by gravity.

The shutter may be configured move together with the shutter, and, for example, the moving member and the shutter may be formed integrally in one piece. The moving member and the shutter may be movable along a straight line, movable along a curved line, or may be rotatable.

The shutter may open and close in synchronization with the opening and closing of the cover of the main housing. For example, an interlocking mechanism that moves in synchronization with the opening and closing of the cover may be configured to push the moving member from the first position to the second position.

The shutter spring may operate to bias the moving member form the second position toward the first position. For example, a shutter that is caused to rotate by the biasing force of the shutter spring may push the opposing portion to one side in the third direction, and receive the reaction force from the opposing portion to thereby move together with the moving portion.

The fixing device may be configured to not include at least one of the shutter spring and the move spring. When there is no move spring, for example, the moving member may be moved by hand or be electrically motorized. When there is no shutter spring, for example, the shutter may be configured to be caused to rotate and close by gravity when the moving member moves from the second position to the first position.

The spring may be a spring that biases the moving member from the second position to the first position. For example, by modifying the structure around the shutter spring of the above-described embodiment, the shutter spring may be used as this spring. Specifically, for example, the image forming apparatus may be configured such that the shutter caused to rotate by the biasing force of the shutter spring may push the opposing portion in a direction toward the first side in the third direction and receive the reaction force from the opposing portion to apply the biasing force of the shutter spring via the shutter to the moving member.

When the fixing device comprises the spring, the image forming apparatus may not comprise an attaching spring.

When the image forming apparatus comprises an attaching spring, the fixing device may not comprise a moving member, a spring, and a rotation stopping portion, and the main housing may not include a contact portion and a restraining surface.

The fixing device may not comprise a shutter.

Each element explained above in connection with the embodiments and modified examples may be combined where appropriate for practical implementation.

What is claimed is:

1. An image forming apparatus, comprising:

a fixing device that thermally fixes a toner image onto a sheet;

a main housing that supports the fixing device in a manner that allows the fixing device to be attached thereto and detached therefrom, the main housing including a contact portion that contacts the fixing device; and a drum cartridge attachable to and detachable from the main housing, wherein the fixing device comprises:

a fixing device housing having an opening that allows a sheet to pass therethrough;

a shutter configured to move between an open position in which the shutter opens the opening and a close position in which the shutter closes the opening;

a spring biasing the shutter in such a direction as to cause the shutter to close the opening; and a movable body interlocking with the shutter, the movable body configured to move between a first position in which the shutter is caused to be in the close position and a second position in which the shutter is caused to be in the open position, wherein in a process of attaching the fixing device to the main housing, contact of the movable body with the contact portion causes the movable body to move from the first position to the second position, thereby causing the shutter to move from the close position to the open position against a biasing force of the spring, wherein in a process of detaching the fixing device from the main housing, the shutter is caused to move to the close position by the biasing force of the spring, wherein the contact portion contacts the drum cartridge in a state that the drum cartridge is attached to the main housing, and wherein a direction of a force applied from the movable body to the contact portion is opposite to a direction of a force applied from the drum cartridge to the contact portion.

2. The image forming apparatus according to claim 1, wherein the shutter has a through hole, the through hole extending through the shutter in an up-down direction when the shutter is in an open state.

3. The image forming apparatus according to claim 1, wherein the fixing device further comprises:

a heating member configured to heat a sheet; and a pressure member configured to nip a sheet in combination with the heating member.

4. An image forming apparatus, comprising:

a fixing device that thermally fixes a toner image onto a sheet; and a main housing that supports the fixing device in a manner that allows the fixing device to be attached thereto and detached therefrom, the main housing including a contact portion that contacts the fixing device, wherein the contact portion is a shaft extending in a direction of a width of the sheet, the direction of the width of the sheet being a direction perpendicular to a direction in which the sheet is conveyed, wherein the fixing device comprises:

a fixing device housing having an opening that allows a sheet to pass therethrough;

a shutter configured to move between an open position in which the shutter opens the opening and a close position in which the shutter closes the opening;

a spring biasing the shutter in such a direction as to cause the shutter to close the opening; and a movable body interlocking with the shutter, the movable body configured to move between a first position in which the shutter is caused to be in the close position and a second position in which the shutter is caused to be in the open position, wherein in a process of attaching the fixing device to the main housing, contact of the movable body with the contact portion causes the movable body to move from the first position to the second position, thereby causing the shutter to move from the close position to the open position against a biasing force of the spring, and wherein in a process of detaching the fixing device from the main housing, the shutter is caused to move to the close position by the biasing force of the spring, wherein the main housing includes:

a first side frame; and a second side frame located apart from the first side frame in the direction of the width of the sheet, and wherein the shaft connects the first side frame and the second side frame.

5. An image forming apparatus, comprising:

a fixing device that thermally fixes a toner image onto a sheet; and a main housing that supports the fixing device in a manner that allows the fixing device to be attached thereto and detached therefrom, the main housing including a contact portion that contacts the fixing device, wherein the fixing device comprises:

a fixing device housing having an opening that allows a sheet to pass therethrough;

a first shutter configured to move between an open position in which the first shutter opens the opening and a close position in which the first shutter closes the opening;

a second shutter rotatably supported by the first shutter;

a spring biasing the first shutter in such a direction as to cause the first shutter to close the opening; and a movable body interlocking with the first shutter, the movable body configured to move between a first position in which the first shutter is caused to be in the close position and a second position in which the first shutter is caused to be in the open position, wherein in a process of attaching the fixing device to the main housing, contact of the movable body with the contact portion causes the movable body to move from the first position to the second position, thereby causing the first shutter to move from the close position to the open position against a biasing force of the spring, and wherein in a process of detaching the fixing device from the main housing, the first shutter is caused to move to the close position by the biasing force of the spring, wherein the first shutter has a through hole that extends through the first shutter in a direction of thickness of the first shutter.

6. The image forming apparatus according to claim 5, wherein the opening is an opening through which a sheet conveyed from outside of the fixing device housing passes to enter the fixing device housing.

* * * * *